(12) United States Patent
Chen et al.

(10) Patent No.: US 11,057,404 B2
(45) Date of Patent: Jul. 6, 2021

(54) METHOD AND APPARATUS FOR DEFENDING AGAINST DNS ATTACK, AND STORAGE MEDIUM

(71) Applicant: TENCENT TECHNOLOGY (SHENZHEN) COMPANY LIMITED, Guangdong (CN)

(72) Inventors: Fang Zhou Chen, Shenzhen (CN); Feng Bo Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 326 days.

(21) Appl. No.: 16/389,212

(22) Filed: Apr. 19, 2019

(65) Prior Publication Data
US 2019/0245875 A1  Aug. 8, 2019

Related U.S. Application Data

(63) Continuation of application No. PCT/CN2017/116436, filed on Dec. 15, 2017.

(30) Foreign Application Priority Data

Dec. 20, 2016  (CN) .......................... 201611183849.2

(51) Int. Cl.
*G08B 23/00* (2006.01)
*H04L 29/06* (2006.01)
(Continued)

(52) U.S. Cl.
CPC .......... *H04L 63/1416* (2013.01); *H04L 9/32* (2013.01); *H04L 29/06* (2013.01); *H04L 29/12* (2013.01);
(Continued)

(58) Field of Classification Search
CPC ............ H04L 63/1458; H04L 63/0236; H04L 63/0263; H04L 63/107; H04L 63/14;
(Continued)

(56) References Cited

U.S. PATENT DOCUMENTS 8,224,942 B1 * 7/2012 Presotto .................. H04L 43/16
709/223
9,071,576 B1 * 6/2015 Earl ..................... H04L 63/1466
(Continued)

FOREIGN PATENT DOCUMENTS

CN    103152357 A    6/2013
CN    103607385 A    2/2014
(Continued)

OTHER PUBLICATIONS

Pappas et al, Enhancing DNS Resilience Against Denial of Service Attacks, Jun. 28, 2017, IEEE, pp. 1-10.*
(Continued)

*Primary Examiner* — Luu T Pham
*Assistant Examiner* — Jenise E Jackson
(74) *Attorney, Agent, or Firm* — Sughrue Mion, PLLC

(57) ABSTRACT

A method and apparatus for defending against a DNS attack includes receiving a DNS request from a request source and obtaining an IP address of the request source, calculating a characteristic value of the IP address, and searching an internal memory for preset identifier information corresponding to the characteristic value. Based on the preset identifier information corresponding to the characteristic value being a detection identifier indicating an uncertainty of an existence of an attack risk in the DNS request, the method includes obtaining request record information and an unblocking time corresponding to the characteristic value, the request record information including a number of request times from the request source in a predetermined period.
(Continued)

Based on the number of request times exceeding a preset request threshold, determining that the DNS request is an attack request and discarding the DNS request.

17 Claims, 13 Drawing Sheets

(51) Int. Cl.
  *H04L 29/12* (2006.01)
  *H04L 9/32* (2006.01)
(52) U.S. Cl.
  CPC ...... *H04L 61/1511* (2013.01); *H04L 63/1458* (2013.01); *H04L 63/1466* (2013.01)
(58) Field of Classification Search
  CPC ............. H04L 63/1408; H04L 63/1416; H04L 63/1425; H04L 63/1441; H04L 63/1466; H04L 9/0866; H04L 29/06; H04L 29/12; H04L 9/32; G06F 21/50; G06F 21/55; G06F 21/552; G06F 21/554; G06F 21/577; G06F 21/725; G06F 21/44; G06F 21/60; G06F 21/64
  USPC .......................................................... 726/23
  See application file for complete search history.

(56) References Cited

U.S. PATENT DOCUMENTS

| | | | | |
|---|---|---|---|---|
| 2005/0204039 A1* | 9/2005 | Douglis | ............ | H04L 29/12811 709/225 |
| 2006/0031359 A1* | 2/2006 | Clegg | ..................... | H04L 51/12 709/206 |
| 2008/0127324 A1* | 5/2008 | Seo | ..................... | H04L 63/1458 726/13 |
| 2010/0064042 A1* | 3/2010 | Paster | ................... | H04L 63/101 709/225 |
| 2010/0138917 A1* | 6/2010 | Xia | ........................ | G06F 21/552 726/22 |
| 2013/0174253 A1* | 7/2013 | Thomas | .............. | H04L 63/1416 726/22 |
| 2017/0041321 A1* | 2/2017 | Tan | ...................... | H04L 61/1552 |
| 2019/0158605 A1* | 5/2019 | Markuze | ............... | H04L 12/465 |

FOREIGN PATENT DOCUMENTS

| | | |
|---|---|---|
| CN | 103685230 A | 3/2014 |
| CN | 103957195 A | 7/2014 |
| CN | 104079557 A | 10/2014 |
| CN | 104184585 A | 12/2014 |
| CN | 104994117 A | 10/2015 |
| KR | 10-2012-0067584 A | 6/2012 |

OTHER PUBLICATIONS

Singh et al, Memcached DDoS Exploits: Operatons Vulnerabilities Preventions and Mitigations, Oct. 27, 2018, pp. 171-179.*
Karasaridis et al, Detection of DNS Anomalies Using Flow Data Analysis, Dec. 1, 2006, IEEE, pp. 1-6.*
Kambourakis et al, A Fair Solution to DNS Amplification Attacks, Aug. 28, 2007, IEEE, pp. 1-10.*
Communication dated Apr. 10, 2020, from the State Intellectual Property Office of the P.R. Of China in Application No. 201611183849.2.
International Search Report for PCT/CN2017/116436 dated, Mar. 8, 2018 (PCT/ISA/210).
Written Opinion dated Mar. 8, 2018 from the International Bureau in International Application No. PCT/CN2017/116436.
Communication dated Sep. 17, 2020 by the China National Intellectual Property Administration in application No. 201611183849.2.

* cited by examiner

METHOD AND APPARATUS FOR DEFENDING AGAINST DNS ATTACK, AND STORAGE MEDIUM

CROSS-REFERENCE TO RELATED APPLICATIONS

This application is a continuation of International Patent Application No. PCT/CN2017/116436 filed on Dec. 15, 2017, which claims priority from Chinese Patent Application No. 201611183849.2, filed in the Chinese Patent Office on Dec. 20, 2016 and entitled "METHOD AND APPARATUS FOR DEFENDING AGAINST DNS ATTACK, AND SYSTEM," the disclosures of which are incorporated herein by reference in their entireties.

BACKGROUND

1. Field

Methods and apparatuses consistent with embodiments relate to the field of computer security technologies, and in particular, to a method and an apparatus for defending against a DNS attack, and a storage medium.

2. Description of Related Art

A domain name system (DNS) includes a parser and a domain name server. The domain name server stores domain names of all hosts in the network and corresponding IP addresses, and converts a domain name to an IP address. A domain name needs to correspond to an IP address, but an IP address may not necessarily have a domain name. In the Internet network, a domain name corresponds one-to-one to an IP address. Although a domain name is easier for people to remember, machines identify each other only by an IP address. A conversion between a domain name and an IP address is referred to as domain name parsing. The domain name parsing may be performed using a dedicated domain name parsing system, and the DNS is a system that performs the domain name parsing. The domain name parsing system is located in user space. A DNS data packet is first received by hardware of the user, then is transmitted to the kernel, and then is further transmitted upward to the user space. The domain name parsing system in the user space parses the data packet, and then the parsed data packet is transmitted to a destination port by the kernel and the hardware to complete parsing work.

SUMMARY

According to an embodiment, there is provided a method for defending against a DNS attack, the method being performed by an apparatus for defending against the DNS attack, the method including receiving a DNS request from a request source, obtaining an IP address of the request source from which the DNS request is received, calculating a characteristic value of the IP address, and searching an internal memory for preset identifier information corresponding to the characteristic value. Based on the preset identifier information corresponding to the characteristic value being a detection identifier indicating an uncertainty of an existence of an attack risk in the DNS request, the method includes obtaining request record information and an unblocking time corresponding to the characteristic value, the request record information including a quantity of request times from the request source in a predetermined period. Based on the quantity of request times exceeding a preset request threshold, the method includes determining that the DNS request is an attack request and discarding the DNS request, and based on the quantity of request times not exceeding a preset request threshold and a current time not reaching a preset unblocking time, determining that the DNS request is the attack request and discarding the DNS request.

According to another embodiment, there is provided a method for defending against a DNS attack, the method being performed by an apparatus for defending against the DNS attack, the method including receiving a DNS request, obtaining a domain name in the DNS request, calculating a characteristic value of the domain name, and obtaining identifier information corresponding to the characteristic value from an internal memory that stores the characteristic value. Based on the identifier information corresponding to the characteristic value being a detection identifier indicating an uncertainty of an existence of an attack risk in the DNS request, the method includes obtaining request record information and an unblocking time that correspond to the characteristic value, the request record information including a quantity of request times from the domain name in a predetermined period. Based on the quantity of request times exceeding a preset request threshold, the method includes determining that the DNS request is an attack request and discarding the DNS request, and based on the quantity of request times not exceeding a preset request threshold and a current time not reaching a preset unblocking time, determining that the DNS request is the attack request and discarding the DNS request.

According to another embodiment, there is provided an apparatus for defending against a DNS attack including at least one memory configured to store computer program code and at least one processor configured to access the at least one memory and operate according to the computer program code. The computer program code may include request obtaining code configured to cause the at least one processor to receive a DNS request sent by a request source and obtain an IP address of the request source that sends the DNS request, characteristic value determining code configured to cause the at least one processor to calculate a characteristic value of the IP address, first query code configured to cause the at least one processor to search an internal memory for preset identifier information corresponding to the characteristic value, second query code configured to cause the at least one processor to, based on the preset identifier information corresponding to the characteristic value being a detection identifier indicating an uncertainty of an existence of an attack risk in the DNS request, obtain request record information and an unblocking time corresponding to the characteristic value, the request record information comprising a quantity of request times from the request source in a predetermined period, quantity of request times judgment code configured to cause the at least one processor to determine whether the quantity of request times exceeds a preset request threshold, attack judgment code configured to cause the at least one processor to, based on the quantity of request times exceeding the preset request threshold, determine that the DNS request is an attack request and based on the quantity of request times not exceeding the preset request threshold and a current time not reaching a preset unblocking time, determine that the DNS request is the attack request, and defense code configured to cause the at least one processor to discard the DNS request.

DESCRIPTION OF EMBODIMENTS

Figure 1:
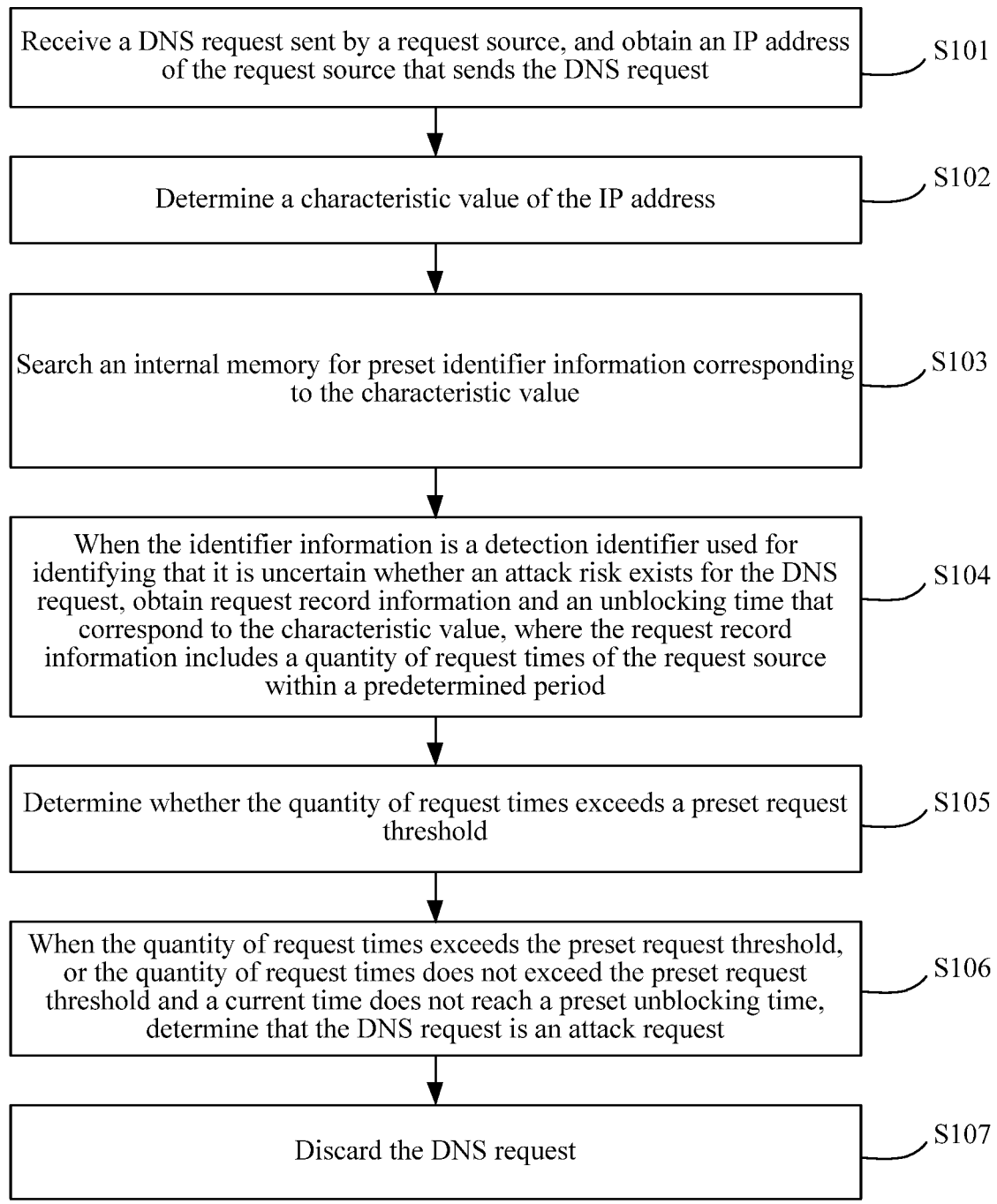
FIG. 1 is a flowchart of a method for defending against a DNS attack according to an embodiment.

The following describes the technical solutions in the embodiments of the present application with reference to the accompanying drawings in the embodiments of the present application.

It should be noted that, terms such as "first" and "second" in the specification and claims of this application and the accompanying drawings are used to distinguish similar objects, but are not necessarily used to describe a specific sequence or a precedence level. It should be understood that, data used in this way may be interchanged in a proper circumstance, so that the embodiments of this application described herein may be implemented in a sequence different from those shown in the drawings or described herein. In addition, terms "include" and "have" and any variation thereof are intended to cover nonexclusive including. For example, a process, method, system, product, or device including a series of steps or units are not limited to those clearly listed steps or units, but may include another step or unit that is not clearly listed or is inherent for the process, method, product or device.

A problem exists in the Internet network environment in which a network attacker may send a DNS query request to a DNS server using a false source address to hide an identity of the attacker. Accordingly, a characteristic of a DNS may determine whether a DNS query request packet and a DNS query answer packet are forged. Also when the DNS server responds to each DNS query request, and may not be able to determine whether a DNS query request includes a malicious attack. Further, when the DNS server parses a domain name, an answer packet may be larger than a query packet, so the attack may be amplified. A DNS attack may seriously overload or even paralyze the DNS server, and may cause the DNS server to fail to respond to a DNS request packet of an innocent user.

In an embodiment, a fixed defense domain name and a fixed defense threshold may be set to detect a DNS attack behavior. For example, a quantity of domain names matching the defense domain name within a detection period may be counted. Then, the quantity may be compared with the fixed defense threshold, and when the quantity exceeds the fixed defense threshold, it may be determined that the DNS is attacked. However, when an attacker performs a DNS attack using a changing domain name, a preset defense domain name may be fixed, and therefore, a detected quantity of DNS request packets may not exceed a specified defense threshold. Accordingly, the DNS attack behavior may not be detected, causing the DNS server to be overloaded or even paralyzed.

One of the characteristics of the DNS attack may include an attacker sending a large quantity of request data packets to a targeted IP address, and the DNS of the targeted IP address may need to respond to the large quantity of request data packets.

In an embodiment, a method used for tackling a DNS attack may include limiting a quantity of IP address requests by using a firewall. For example, controlling a quantity of DNS request packets sent to an IP address segment. Specifically, the method may limit the number of DNS request packets to no more than 300 packets per second, where a request that is sent after the number is exceeded is considered as a possible attack and is discarded. When this limitation measure is used, a corresponding limitation rule needs to be set for the IP address segment. Upon determining that the request is a DNS attack, matching a domain name with an IP address one-by-one needs to be performed based on the set rule until the matching correctly identifies all the domain names associated with an IP address. However, when there are many set rules, the efficiency of performing the matching may be reduced.

An operating system has a kernel space and a user space. A kernel function module is executed in the kernel space and an application program is executed in the user space. The kernel runs at the highest level (the kernel space) and the application program runs at a relatively low level (the user space). A user process in the user space and a kernel process in the kernel space communicate with each other by using a netlink socket. Using Linux, as an example, an ordinary Linux system software may be in the user space and may not be able to directly interact with the Linux system kernel so user space software iptables may be used for controlling a software framework netfilter that is in the Linux kernel for managing a network data packet. The conventional method for defending against a DNS attack is performed by adding a determining rule to the kernel module in the kernel space and processing the network data packet based on the determining rule. A block determining procedure in the kernel space controlled by iptables is relatively complex and the matching needs to be performed on the rule one-by-one. A request may be determined as a DNS attack only after the matching is completed. In addition, when there are many rules, efficiency may be reduced.

The following embodiments are provided to overcome and solve the foregoing problems.

This embodiment provides a method for defending against a DNS attack. It should be noted that the steps shown in a flowchart of the accompanying drawings may be performed, for example, in a computer system with a group of computer executable instructions. In addition, although a logical sequence is shown in the flowchart, the shown or described steps may be performed in a sequence different from the sequence provided herein.

FIG. 1 is a flowchart of a method for defending against a DNS attack according an embodiment.

In step S101, the method may include receiving a DNS request sent by a request source and obtain an IP address of the request source sending the DNS request.

In step S102, the method may include determining a characteristic value of the IP address.

In step S103, the method may include searching an internal memory for preset identifier information corresponding to the characteristic value.

In step S104, the method may include, when the identifier information is a detection identifier used for identifying whether an attack risk exists for the DNS request, obtaining request record information and an unblocking time that correspond to the characteristic value, where the request record information may include a quantity of request times of the request source within a predetermined period.

In step S105, the method may include determining whether the quantity of request times exceeds a preset request threshold.

In step S106, the method may include, when the quantity of request times exceeds the preset request threshold or when the quantity of request times does not exceed the preset request threshold and a current time does not reach a preset unblocking time, determining that the DNS request is an attack request.

In step S107, the method may include discarding the DNS request.

Additionally, in step S101, after the receiving a DNS request sent by a request source, the method may further include separately determining whether a data format of a data packet of the DNS request satisfies a predetermined protocol and whether a destination port of the DNS request is a predetermined port, and if the data format of the data packet of satisfies the predetermined protocol and the destination port is the predetermined port, obtaining an IP address of the request source. For example, the determining may be further include determining that the data packet is a UDP packet and that the destination port is 53. If the condition is not satisfied, the data packet may be transmitted so that normal transmission of another data packet is not affected. In an embodiment, the request source may be a terminal device that initiates the DNS request.

The determining may be a DNS format stipulated in a Request For Comments (RFC). For example, a DNS query is performed by using the following content in an RFC document to determine a request data packet: 1034 Domain names, concepts and functions; 1035 Domain names, implementations and norms; 1123 Internet host requirements, applications and supports; 1886 DNS extension names supporting the IP version 6; 1995 Incremental area transmission in the DNS; 1996 Mechanism for notifying an area change (DNS NOTIFY); 2136 Dynamic update in a domain name system (DNS UPDATE); 2181 Descriptions about DNS norms; 2308 Negative cache for a DNS query (DNS NCACHE); 2535 Domain Name Security Extensions (DNSSEC); 2671 DNS extension mechanism (EDNSO); 2782 DNS RR of a specified service location (DNS SRV).

In addition, a validity check may be performed on the DNS request data packet. The check items may include determining whether a size of the data packet is normal, whether a domain name is valid, whether a request type is valid, and the like.

A method of determining the characteristic value of the IP address in step S102 may further include determining the characteristic value of the IP address based on first three segments of numerical values of the IP address, determining the characteristic value of the IP address based on last three segments of numerical values of the IP address, calculating a hash value of first three segments of numerical values of the IP address and using the hash value as the characteristic value of the IP address, and calculating a hash value of last three segments of numerical values of the IP address and using the hash value as the characteristic value of the IP address. In the Internet network, first three segments of numerical values of an ordinary IP address may represent a network number and a computer number, and may be used for distinguishing different IP sources. In a local area network, all IP addresses have a same first segment of numerical value, and this may not be helpful for distinguishing different IP sources. Therefore, only last three segments of numerical values of an IP address may be considered.

For example, a method for determining the characteristic value of the IP address may be based on the first three segments of numerical values of the IP address may include reading the IP address, obtaining the first three segments of numerical values of the IP address, where the three segments of numerical values is combined to obtain a transit IP address, and the first three segments of numerical values of the transit IP address is the same as the first three segments of numerical values of the IP address. A fourth segment of numerical value of the transit IP address is 0, and this transit IP address is the characteristic value of the IP address. As another example, a method for determining the characteristic value of the IP address may be based on the last three segments of numerical values of the IP address, similar to the foregoing method. A difference is that, the fourth segment of numerical value of the transit IP address is 0 and that the last three segments of numerical values of the transit IP address are consistent with the last three segments of numerical values of the IP address.

IP is a protocol designed for mutual connection and communication between computer networks. An IP address is for enabling computers connected to the Internet to identify each other during communication. A unique 32-bit address is allocated to each host on the Internet, and the address is referred to as the IP address. The IP address in this embodiment is an IPV4 address by default. For the IPV4 address, there are a total of 255*255*255*255 IPV4 addresses. Theoretically, a kernel module of the operating system may store all IP addresses and corresponding related information. However, during actual implementation, each IP address needs to be stored by using 20 to 30 bytes, approximately over 90 G internal memory space needs to be occupied, and internal memory costs are excessively high. Therefore, in this embodiment, an IP address segment or a hash value of an IP address segment is stored so that one characteristic value corresponds to 256 IP addresses and the internal memory costs may be reduced. In addition, the same IP address segment generally indicates the same organization, and a normal DNS request is generally from a recursive DNS server. Therefore, querying for response information by using an IP address segment as a characteristic value does not affect the normal DNS request.

Figure 3:
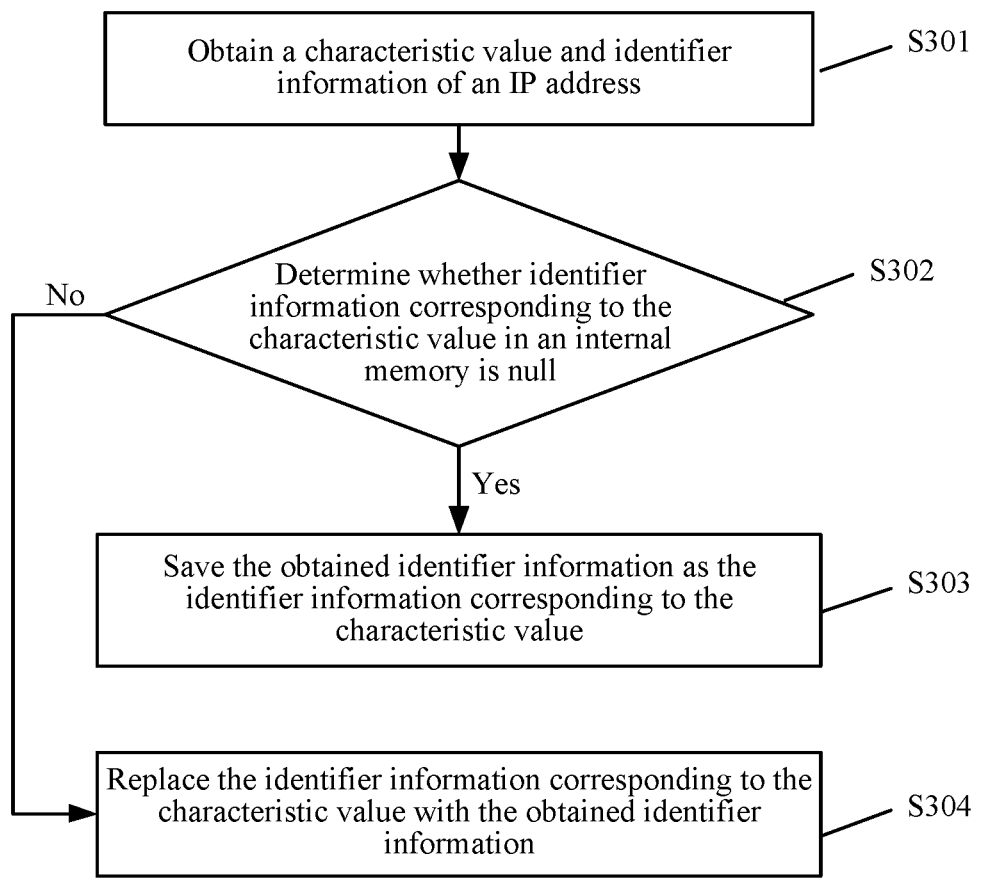
FIG. 3 is a flowchart of a method for updating identifier information corresponding to a characteristic value in an internal memory according to an embodiment.

FIG. 3 is a flowchart of a method for updating identifier information corresponding to a characteristic value in an internal memory according to an embodiment. Referring to FIG. 3, before the step S103 of searching the internal memory for the identifier information of the IP address based on the characteristic value, the method further includes the following steps.

In step S301, the method obtains a characteristic value and identifier information of an IP address.

In step S302, the method determines whether identifier information corresponding to the characteristic value in an internal memory is null.

In step S303, if the identifier information is null, the method saves the obtained identifier information as the identifier information corresponding to the characteristic value. Further, the obtained identifier information may be added to the identifier information corresponding to the characteristic value in the internal memory.

In step S304, if the identifier information is not null, the method replaces the identifier information corresponding to the characteristic value in the internal memory with the obtained identifier information.

A system monitors data traffic from a kernel space to an application space in real time. When the data traffic unusually surges within a certain time segment, a DNS request is captured by using a hook function registered in a firewall framework by the operating system in advance or a DNS request log may be analyzed to obtain a quantity of request times. Then, identifier information of an IP address of a request source whose quantity of request times exceeds a preset threshold is recorded as a detection identifier. The characteristic value of the IP address is determined by using the method in step S102, and the characteristic value and the detection identifier are sent to the kernel space using netlink. Alternatively, the identifier information may be manually set and sent to the kernel space by using a user space to store and update the characteristic value and the identifier information.

In an embodiment, a whitelist identifier and/or a blacklist identifier may be further set for an IP segment. For example, for a famous public recursive DNS, a quantity of request times from a back-end address of the famous public recursive DNS to an authorized DNS server may be relatively large, and if all requests from these addresses are normal, a whitelist identifier may be set for an IP segment to which the back-end address of the famous public recursive DNS belongs. After the whitelist identifier is set, the DNS request may not be discarded regardless of the quantity of request times.

Irrespective of whether the detection identifier is set manually by using a user-layer tool or set automatically when the quantity of request times exceeds the threshold, unblocking may be performed after a specified time. For example, a specified time is preset on a timer, and when a current time reaches the specified time, that is, when the specified time expires, an unblocking operation is performed. Further, the detection identifier corresponding to the characteristic value of the IP address may be deleted to end operations to identify whether an attack risk exists for the DNS request. For an IP address segment for which the blacklist identifier is specified, all request packets may be discarded regardless of the quantity of request times, that is, the IP address segment on the blacklist identifier is always blocked.

In step S103, the identifier information of the IP address may be found in the internal memory based on the characteristic value of the IP address, and characteristic values and the related information of all IPV4 addresses may be recorded in the internal memory.

The internal memory stores array elements in a form of an array, and the array elements include a characteristic value, identifier information, request record information, and an unblocking time. The identifier information may include a whitelist identifier, a blacklist identifier, and a detection identifier. The whitelist identifier indicates that no attack risk exists. For example, when a recorded quantity of DNS requests from the IP address in a given time does not exceed a minimum threshold, the method determines that no attack risk exists for the IP address and a whitelist identifier may be set for the IP address. The blacklist identifier indicates that a serious attack risk exists. For example, when a recorded quantity of DNS requests from the IP address in a given time exceeds a maximum threshold, a blacklist identifier may be set for the IP address. However, when the detection identifier indicates that it is uncertain whether an attack risk exists, a further check may be needed. For example, when a recorded quantity of DNS requests from the IP address in a given time is greater than or equal to the minimum threshold and is less than the maximum threshold, a detection identifier may be set for the IP address. The identifier information corresponding to the characteristic value may be set manually, or may be marked or modified based on the detection result received from the user space. The request record information may include a DNS request time and a quantity of request times within a predetermined period. Before the request record information is updated, the internal memory stores a time of a last request and a quantity of request times. The unblocking time refers to a time at which the unblocking the IP address corresponding to the characteristic value after the specified time. The unblocking time may be set in a countdown form and may be returned to zero after the countdown is over. After the unblocking time is returned to zero, the corresponding IP segment may be blocked. In addition, one or more unblocking times may be set in the system, and different blocking times may be assigned for IP addresses corresponding to different characteristic values. Further, the blocking time refers to a time at which the system blocks the IP address upon determining that a DNS request from the IP address is an attack request.

In an embodiment, if the identifier information found in the internal memory based on the characteristic value of the IP address is a blacklist identifier, a data packet of the DNS request may be discarded. If the identifier information found in the internal memory based on the characteristic value of the IP address is a whitelist identifier, the DNS request may be accepted.

Figure 2:
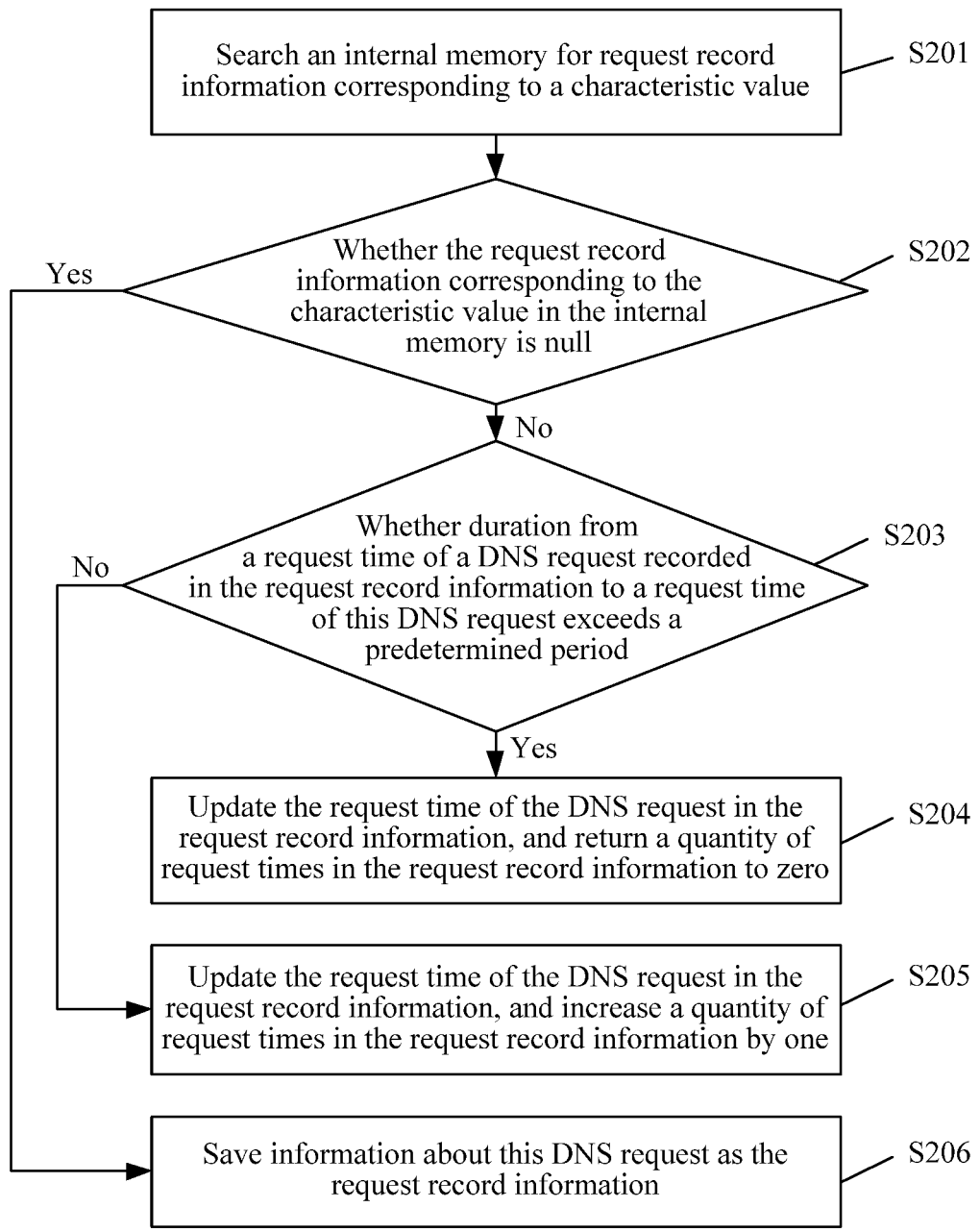
FIG. 2 is a flowchart of a method for updating request record information corresponding to a characteristic value in an internal memory according to an embodiment.

In step S104, prior to the obtaining request record information and setting an unblocking time that correspond to the characteristic value, the method may further includes updating the request record information corresponding to the characteristic value. FIG. 2 is a flowchart of a method for updating request record information corresponding to a characteristic value in an internal memory according to an embodiment. Referring to FIG. 2, the method for updating request record information corresponding to a characteristic value may include the following steps.

In step S201, the method may include searching an internal memory for request record information corresponding to a characteristic value.

In step S202, the method may include determining whether the request record information corresponding to the characteristic value in the internal memory is null.

In step S203, if the request record information corresponding to the characteristic value in the internal memory is not null, the method may include determining whether a duration from a request time of a DNS request recorded in the request record information to a request time of this DNS request exceeds a predetermined period.

In step S204, if the duration exceeds the predetermined period, the method may include updating the request time of the DNS request in the request record information and returning a quantity of request times in the request record information to zero. A specific method for updating the request time of the DNS request in the request record information may further include replacing the request time in the request record information with the request time of the DNS request.

In step S205, if the duration does not exceed the predetermined period, the method may include updating the request time of the DNS request in the request record information, and increasing a quantity of request times in the request record information by one. A specific method for updating the request time of the DNS request in the request record information may further include replacing the request time in the request record information with the request time of the DNS request.

In step S206, when the request record information corresponding to the characteristic value in the internal memory is null, the method may include saving information about the DNS request as the request record information. Specifically, the request time of the DNS request and the quantity of request times may be saved as the request record information.

In step S104, the request record information found in the internal memory based on the characteristic value of the IP address is information updated based on the DNS request.

In step S106, the method of determining whether the request source performs a DNS attack is determined based on a determining result and the unblocking time may further include, if the quantity of request times exceeds the request threshold, determining that the request source is performing a DNS attack, and resetting the unblocking time corresponding to the characteristic value. Further, if the quantity of request times does not exceed the request threshold, the method may further include determining whether the unblocking time corresponding to the characteristic value has expired, and if the unblocking time has expired, the method may further include determining that the DNS request is a normal request. However, if the unblocking time has not expired, the method may further include determining that the request source is performing the DNS attack. For an IP address that corresponds to a characteristic value and whose identifier information is a detection identifier, a quantity of request times of a source IP address within a predetermined period may be determined so that, for the IP address whose quantity of request times exceeds the request threshold, an unblocking time may be reset and a blocking time of the IP address may be prolonged. For an IP address whose quantity of request times does not exceed the request threshold, if the unblocking time has not expired, blocking process is performed. That is, the DNS request is determined as an attack request and normal processing is performed on a DNS request sent from the IP address only after the unblocking time arrives or the blocking time expires. In this way, the efficiency of determining a DNS attack may be increased, and a DNS server can be protected.

For example, it is assumed that a predetermined period is one second. Each time a DNS request is received, an IP address of a request source is detected, and a characteristic value of the IP address is determined. Various data corresponding to the characteristic value may be found in an internal memory. If identifier information corresponding to the characteristic value is a detection identifier, a last request time and a quantity of request times of the IP address corresponding to the characteristic value may be obtained, and determine whether duration from a current time to a storage time exceeds one second. If the duration exceeds one second, the quantity of request times is returned to zero; or if the duration does not exceed one second, the quantity of request times is increased by one. If the quantity of request times exceeds the request threshold (that is, the quantity of request times within one second exceeds the threshold) in this case, a data packet of the DNS request is discarded, and a blocking time corresponding to the characteristic value is stored in the internal memory. When another request is received from the IP address again next time, if the blocking time has not expired, a packet is discarded and blocking continues.

In step S107, a DNS attack determining is performed in the kernel space to discover a DNS attack, and an attack request packet may be discarded from the kernel space as soon as possible, thereby increasing real-time performance of attack defense.

In this embodiment, DNS attack determining and defense are performed for an IP address of a request source. On one hand, identifier information may be set for each IP address. For example, a green light may be given to a DNS request of an IP address whose identifier information is a whitelist. In contrast, a DNS request of an IP address whose identifier information is a blacklist may be defended against. In addition, a DNS request of an IP address whose identifier information is a detection identifier may be processed. As such, the system does not have to check all IP addresses, and the efficiency of determining a DNS attack may be increased. On the other hand, when the DNS request of the IP address of the detection identifier is processed, a DNS attack may be determined by considering both a determining result for the quantity of request times and the unblocking time. As such, the accuracy of identifying a DNS attack may be increased, and because the unblocking time may be preset and may be adjusted based on the determining result for the quantity of request times, the efficiency of determining a DNS attack may be increased.

In an embodiment, the steps shown in a flowchart of the accompanying drawing may be performed, for example, in a computer system with a group of computer executable instructions. In addition, although a logical sequence is shown in the flowchart, the shown or described steps may be performed in a sequence different from the sequence herein.

Figure 4:
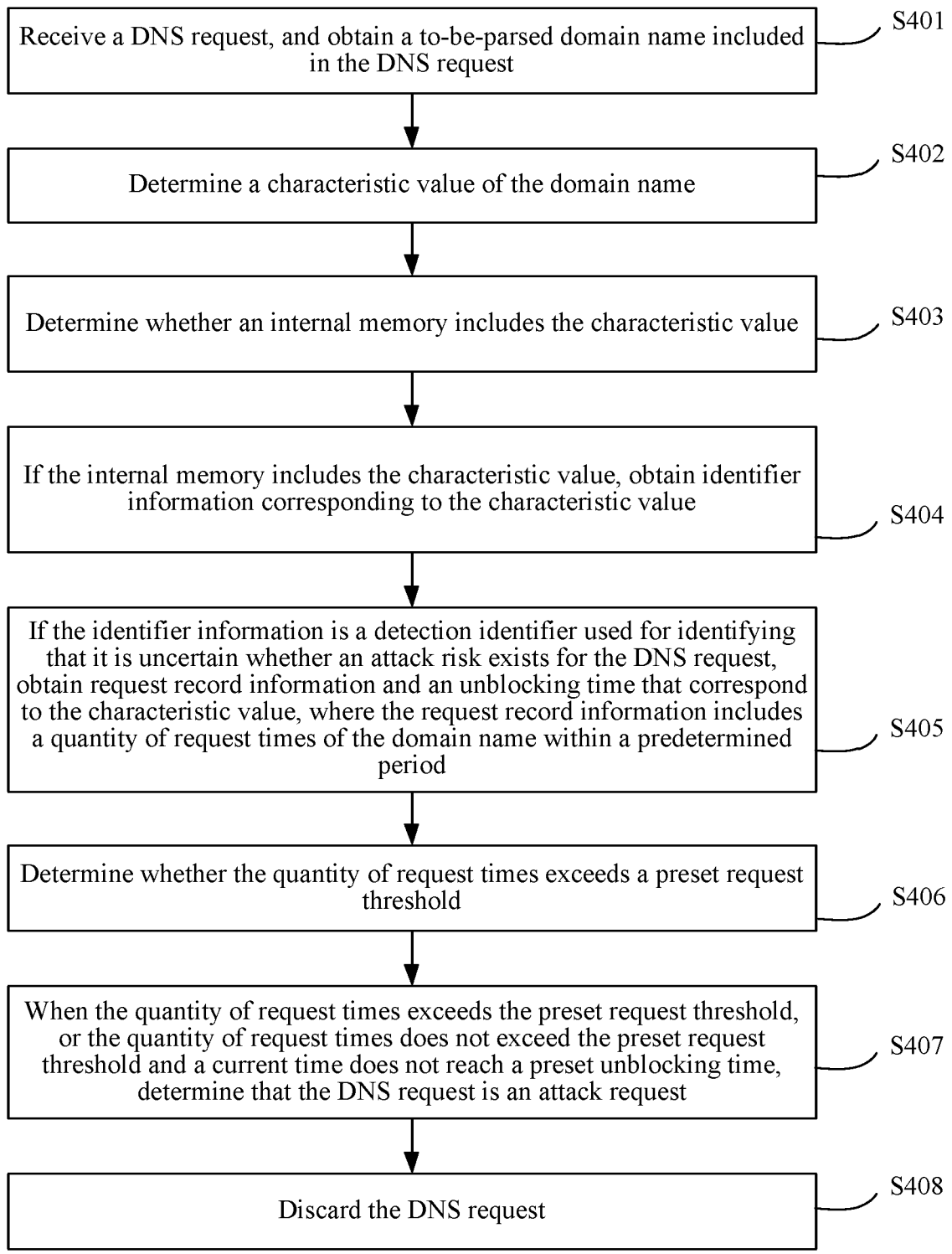
FIG. 4 is a flowchart of a method for defending against a DNS attack according to another embodiment.

FIG. 4 is a flowchart of a method for defending against a DNS attack according to an embodiment. As shown in the figure, the method for defending against a DNS attack includes the following steps.

In step S401, the method receives a DNS request, and obtains a to-be-parsed domain name included in the DNS request.

In step S402, the method determines a characteristic value of the domain name.

In step S403, the method determines whether an internal memory includes the characteristic value.

In step S404, the method, if the internal memory includes the characteristic value, obtains identifier information corresponding to the characteristic value.

In step S405, the method, if the identifier information is a detection identifier used for identifying whether an attack risk exists for the DNS request, obtains request record information and an unblocking time that correspond to the characteristic value, where the request record information includes a quantity of request times of the domain name within a predetermined period.

In step S406, the method determines whether the quantity of request times exceeds a preset request threshold.

In step S407, the method, when the quantity of request times exceeds the preset request threshold or when the quantity of request times does not exceed the preset request threshold and a current time does not reach a preset unblocking time, determines that the DNS request is an attack request.

In step S408, the method discards the DNS request.

In step S401 described above, the method further includes, after the receiving the DNS request, separately determining whether a data format of a data packet of the DNS request satisfies a predetermined protocol and whether a destination port of the DNS request is a predetermined port, and if the data format of the data packet satisfies the predetermined protocol and the destination port is the predetermined port, obtaining, based on the data packet of the DNS request, the domain name parsed out of the request. In an embodiment, the data packet of the DNS request may be a User Datagram Protocol (UDP) packet, and the destination port may be 53. If the condition is not satisfied, the data packet may be transmitted so that normal transmission of other data packets are not affected.

The step S402 of determining the characteristic value of the domain name may further include calculating a first hash value of the domain name by using a first hash algorithm, calculating a second hash value of the domain name by using a second hash algorithm and using the first hash value and the second hash value as the characteristic value of the domain name. The calculations may be performed on a character string of the same domain name by using two different hash algorithms to obtain two hash values so that a hash conflict may be avoided. If the first hash values obtained for two different domain names by using the first hash algorithm are the same, the two domain names may be distinguished by using a second hash value. A probability of both first hash values and second hash values for two domain names being the same in the internal memory may be very small and may be ignored. In addition, the internal memory only stores a domain name that has been attacked or is prone to be attacked.

Figure 5:
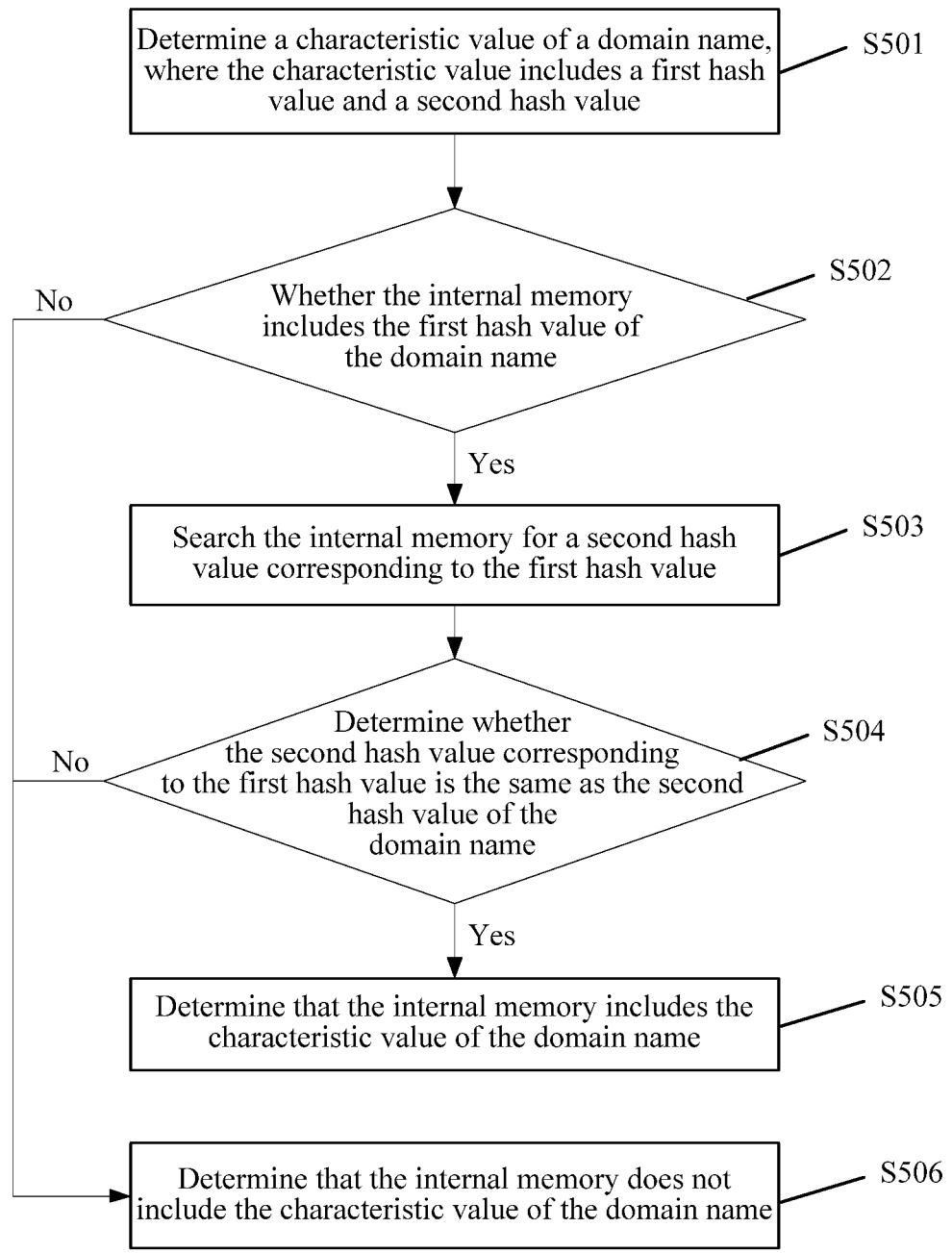
FIG. 5 is a flowchart of a method for determining whether an internal memory includes a characteristic value of a domain name according to an embodiment.

FIG. 5 is a flowchart of a method for determining whether the internal memory includes the characteristic value of the domain name in step S403 according to an embodiment. Referring to FIG. 5, the method for determining whether the internal memory includes the characteristic value may include the following steps.

In step S501, the method determines the characteristic value of the domain name, where the characteristic value includes a first hash value and a second hash value.

In step S502, the method determines whether the internal memory includes the first hash value of the domain name, and if the internal memory includes the first hash value, perform step S503, or if the internal memory does not include the first hash value, perform step S506.

In step S503, the method searches the internal memory for a second hash value corresponding to the first hash value.

In step S504, the method determines whether the second hash value corresponding to the first hash value in the internal memory is the same as a second hash value of the domain name.

In step S505, if the determining result in step S504 finds the second hash value corresponding to the first hash value, the method determines that the internal memory includes the characteristic value of the domain name.

In step S506, if the determining result in step S504 does not find the second hash value corresponding to the first hash value, the method determines that the internal memory does not include the characteristic value of the domain name.

Further, if the internal memory does not include the characteristic value of the domain name, another DNS request may be received. The domain name is different from IP address in that the quantity of domain name is unlimited. Therefore, the internal memory records only domain names that are determined to be secure, be insecure, and have a suspect attack risk. A domain name being secure means that the domain name has no attack risk and is marked by using an unblocking identifier. A domain name being insecure means that the domain name has a very serious attack risk and is marked by using a blocking identifier. A domain name having a suspect attack risk means that it is uncertain whether the DNS request has an attack risk and is marked by using a detection identifier. Accordingly, when the domain name of the received DNS request has an unblocking identifier, the DNS request is sent to a DNS parsing system of a user space. When the domain name of the received DNS request has a blocking identifier, a data packet of the DNS request may be discarded. When the domain name of the received DNS request has a detection identifier, the method further determines whether an attack risk exists by considering both a quantity of request times and an unblocking time of the domain name.

Further, the identifier information of the domain name may be found in the internal memory based on the characteristic value. If the found identifier information is the blocking identifier, the data packet of the DNS request may be discarded. If the found identifier information is the unblocking identifier, the DNS request is accepted. If the found identifier information is the detection identifier, whether to accept the DNS request is further determined by considering both the quantity of request times and the unblocking time of the domain name. Setting the identifier information may simplify the procedure for determining a DNS attack.

To determine whether to accept the DNS request by considering both the quantity of request times and the unblocking time of the domain name, a current quantity of request times and the unblocking time of the domain name need to be obtained from record information of the request. However, the request record information of a last DNS request may still be stored in the internal memory and not updated with the current quantity of request times and the unblocking time of the domain name. Therefore, the request record information corresponding to the characteristic value needs to be updated prior to determining whether to accept the DNS request.

Figure 8:
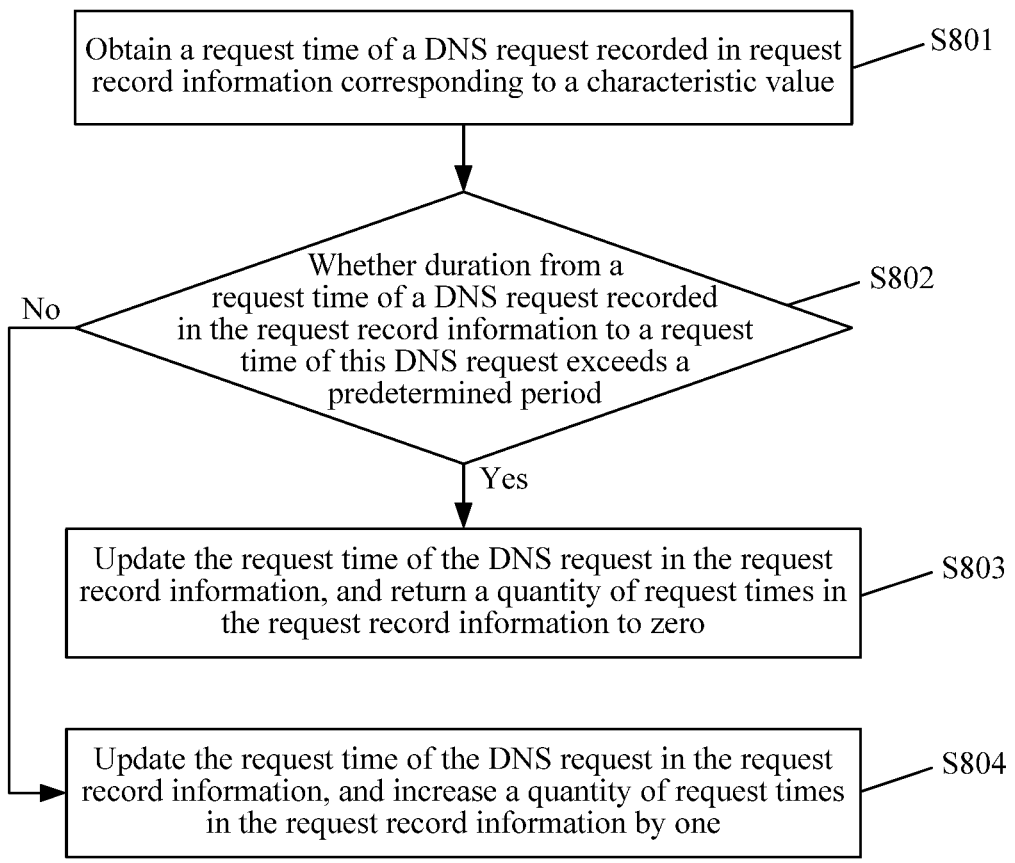
FIG. 8 is a flowchart of a method for updating request record information based on a request time of a DNS request according to an embodiment.

FIG. 8 is a flowchart of a method for updating request record information corresponding to a characteristic value in an internal memory according to an embodiment. Referring to FIG. 8, the method for updating the request record information corresponding to the characteristic value includes the following steps.

In step S801, the method obtains a request time of a DNS request recorded in the request record information corresponding to the characteristic value.

In step S802, the method determines whether a duration from the request time of the DNS request recorded in the request record information to a request time of the current DNS request exceeds a predetermined period.

In step S803, if the duration exceeds the predetermined period, the method updates the request time of the DNS request in the request record information and returns the quantity of request times in the request record information to zero.

In step S804, even if the duration does not exceed the predetermined period, the method updates the request time of the DNS request in the request record information, and increases the quantity of request times in the request record information by one.

Specifically, the request time of the DNS request in the request record information may be updated by replacing the request time in the request record information with the request time of the current DNS request.

Figure 6:
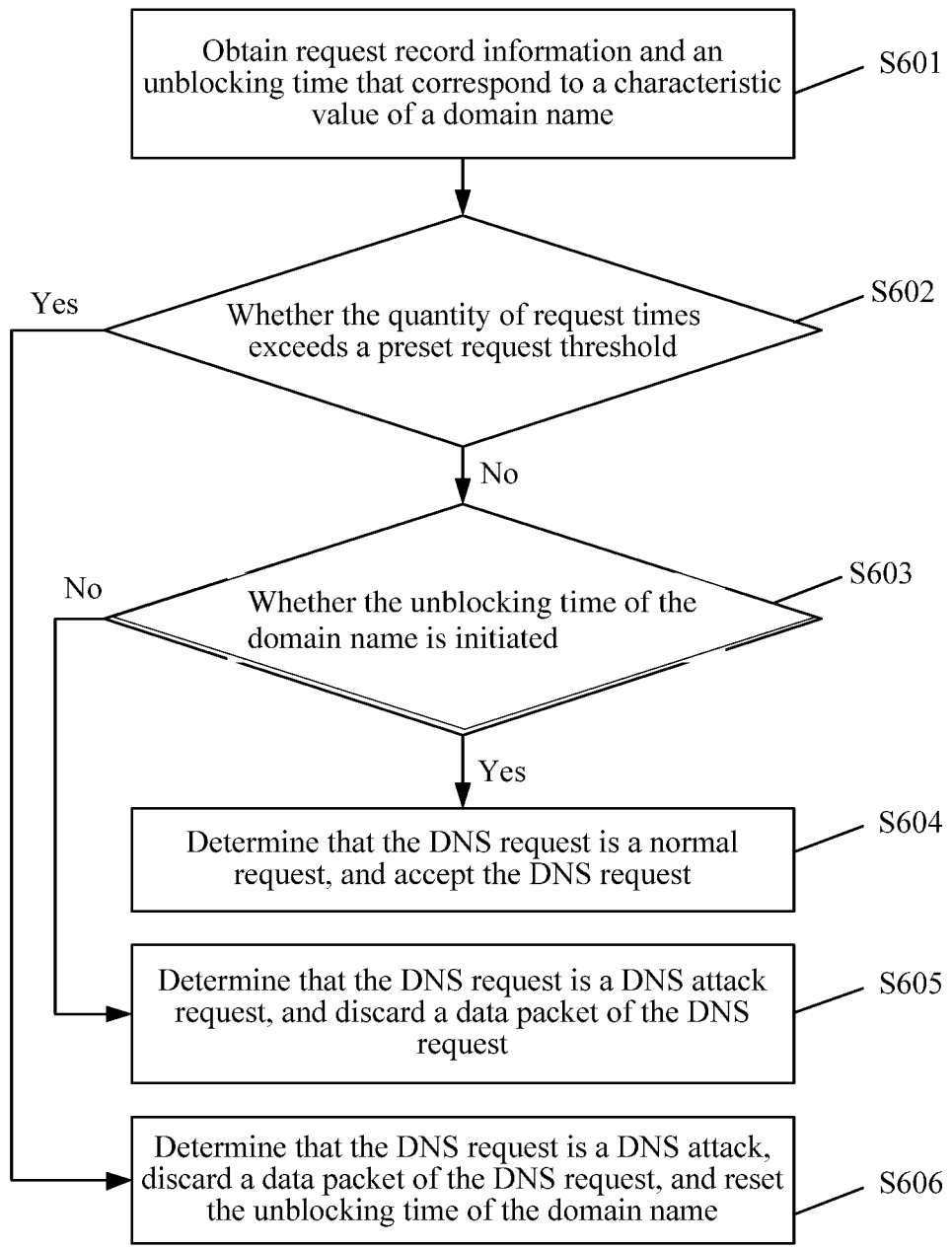
FIG. 6 is a flowchart of a method for determining whether a DNS request is a DNS attack based on a determining result for a quantity of request times and an unblocking time according to an embodiment.

FIG. 6 is a flowchart of a method for determining whether a DNS request is a DNS attack based on a determining result for a quantity of request times and an unblocking time according to an embodiment. Referring to FIG. 6, the method for determining whether the DNS request is a DNS attack based on the determining result and the unblocking time includes the following steps.

In step S601, the method searches, based on a characteristic value of a domain name, an internal memory for request record information and an unblocking time that correspond to the characteristic value of the domain name.

In step S602, the method determines whether the quantity of request times exceeds a preset request threshold.

In step S603, if the quantity of request times does not exceed the request threshold, the method further determines whether the unblocking time of the domain name should be initiated.

In step S604, if the unblocking time is initiated, the method determines that the DNS request is a normal request.

In step S605, if the unblocking time is not initiated, the method determines that the DNS request is a DNS attack request.

In step S606, if the quantity of request times exceeds the request threshold, the method determines that the DNS request is an attack request, discards the data packet of the DNS request, and resets the unblocking time of the domain name.

As an implementation, the internal memory stores a hash value and related information of a domain name in a form of a hash table. The entire hash table arranged in a form of an array. Each item of the hash table is saved as one linked list. Each node of each linked list is configured to store information about a corresponding domain name, and may store the information about the domain name, such as a second hash value, request record information, and an unblocking time. The step S504 of determining whether the second hash value corresponding to the first hash value in the internal memory may be performed by traversing each node of a linked list including the first hash value, comparing the second hash value stored in each node with the second hash value of the domain name, and determining whether the second hash value stored in each node is the same as the second hash value of the domain name. If the second hash value stored in each node is the same as the second hash value of the domain name, it means that the internal memory stores related information of the domain name, and identifier information, request record information, and an unblocking time that correspond to the second hash value may be further obtained.

Figure 9:
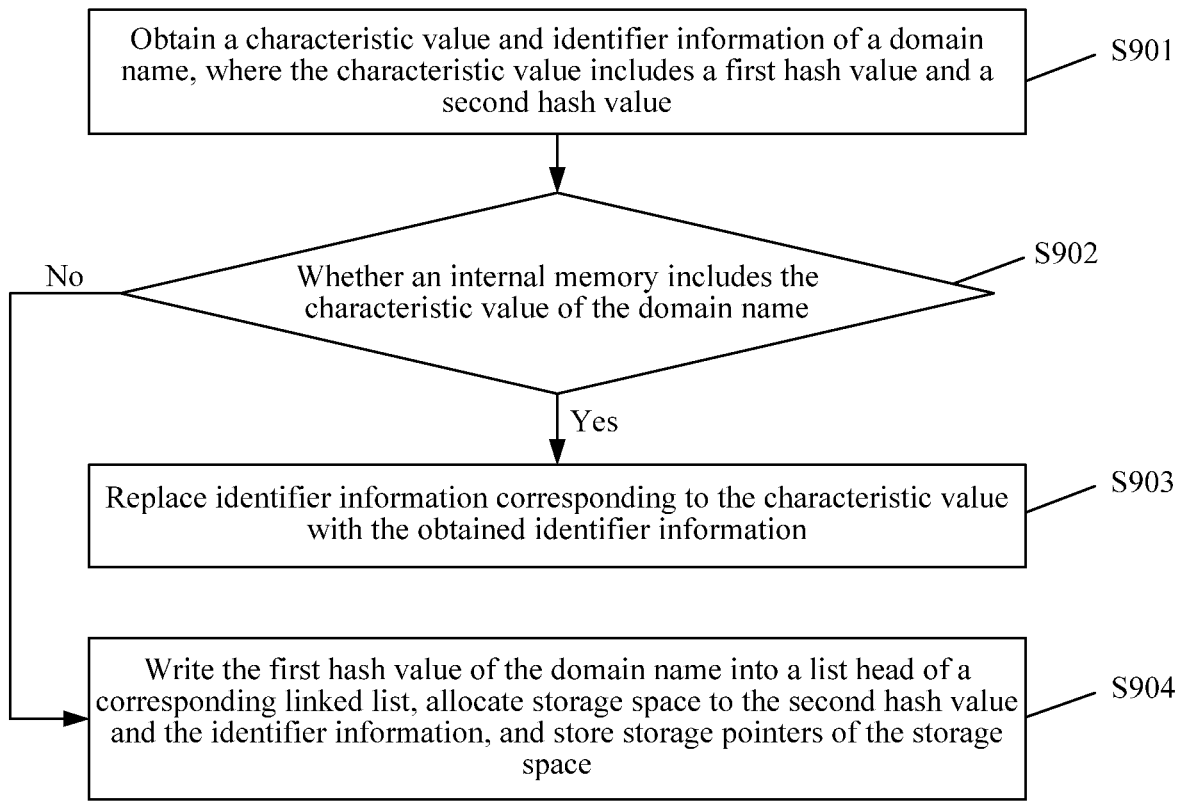
FIG. 9 is a flowchart of a method for adding a characteristic value and identifier information of a domain name to an internal memory according to an embodiment.

FIG. 9 is a flowchart of a method for adding a characteristic value and identifier information of a domain name to an internal memory according to an embodiment. Referring to FIG. 9, the method for adding a characteristic value and identifier information of a domain name to an internal memory includes the following steps.

In step S901, the method obtains a characteristic value and identifier information of a domain name, where the characteristic value includes a first hash value of the domain name calculated by using a first hash algorithm, and a second hash value of the domain name calculated by using a second hash algorithm.

In step S902, the method determines whether the internal memory includes the characteristic value of the domain name.

In step S903, if the internal memory includes the characteristic value, the method replaces identifier information corresponding to the characteristic value with the obtained identifier information.

In step S904, if the internal memory does not include the characteristic value, the method writes the first hash value of the domain name into a list head of a corresponding linked list, allocates storage space, namely, nodes, to the second hash value and the identifier information, and stores storage pointers in a storage space.

A system monitors data traffic from kernel space to application space in real time. When the traffic unusually surges within a time segment, a DNS request is captured by using a hook function registered in a firewall framework by the operating system in advance, or a DNS request log is analyzed, to obtain a quantity of request times. Then, a domain name whose quantity of request times exceeds a threshold is marked by using a detection identifier. For example, a domain name whose quantity of request times is less than a minimum threshold is marked by using an unblocking identifier, a domain name whose quantity of request times is greater than a maximum threshold is marked by using a blocking identifier, and a domain name whose quantity of request times is greater than the minimum threshold and less than the maximum threshold is marked by using a detection identifier. In addition, a characteristic value of a domain name is determined by using the method in step S402, and the characteristic value and the detection identifier are sent to the kernel space by using the netlink. Alternatively, the identifier information may be manually set and sent to the kernel space by using user space to store and update the characteristic value and the identifier information.

For example, it is assumed that the user space detects that a domain name a.com is a suspect domain name, records identifier information of the domain name as a detection identifier, calculates two hash values 32 and 101 of the domain name, and sends the hash values and the detection identifier to the kernel space. In this case, related information of the domain name needs to be stored into a hash table of the internal memory. Here, the first hash value of the domain name a.com is 32 and an item including the hash value 32 in a first row of the hash table may be found. The second hash value 101, the detection identifier, the request record information, and the like may be stored in a node as the list head of the linked list. For example, there may be no other node except for one node and the node may point to null. If the related information of a domain name b.com needs to be subsequently stored and two hash values of the domain name b.com are 32 and 102, the second hash value, the identifier information, the request information, and the like of the domain name b.com may be stored into a second node of the linked list. In this case, the node storing the related information of the domain name a.com does not point to null anymore, but points to the node corresponding to b.com.

Figure 7:
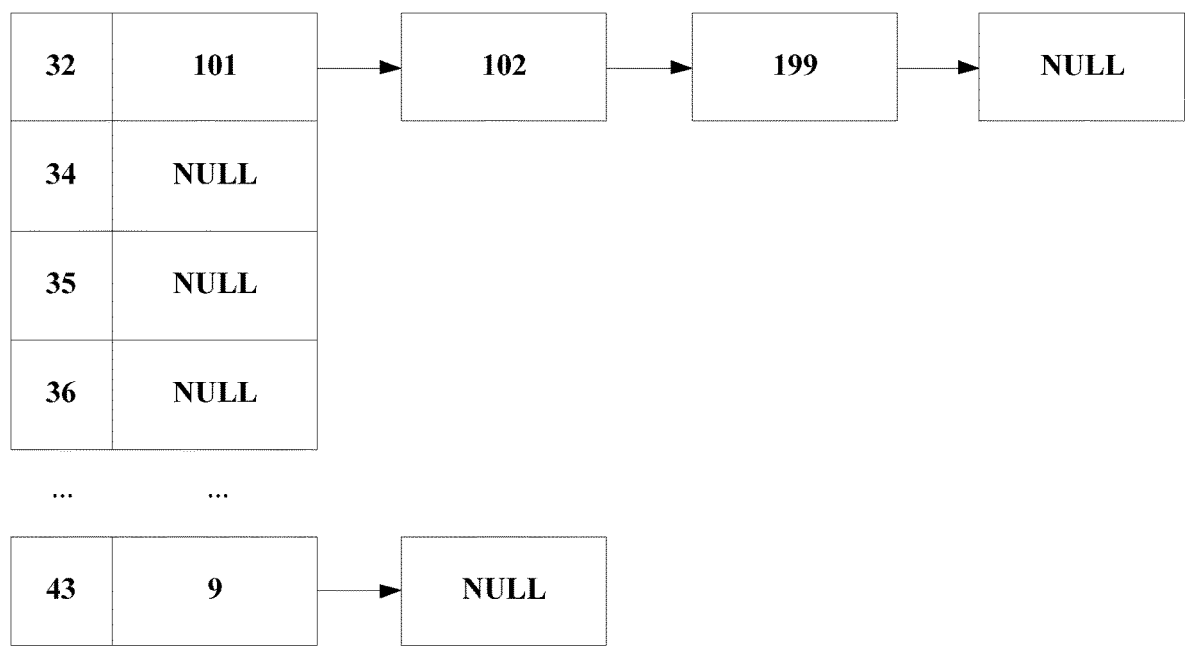
FIG. 7 is a schematic diagram of a hash table in an internal memory according to an embodiment.

The hash table in the internal memory is shown in FIG. 7, and each item of the hash table is a linked list. In FIG. 7, each row indicates one item of the hash table. Some rows are relatively long. For example, the first row, that is, the item specified by the hash value 32 is longer than the other rows.

Here, the first row includes three nodes in the linked list. In contrast, some rows are relatively short. For example, the item specified by the hash value 34 is shorter than the first row item specified by the hash value 32. To query whether the hash table stores the characteristic value of domain name c.com, the method first searches for the item whose hash value is 32 in the first row, and then traverses all nodes of the linked list corresponding to the row, to find a node whose second hash value is 199 and obtain information corresponding to the second hash value, such as detection identifier and request record information.

According to the method for defending against a DNS attack in an embodiment, after the DNS request is received, the method searches the internal memory for the corresponding identifier information based on the information of the domain name of the DNS request. If the DNS request whose identifier information is the unblocking identifier may be accepted, the DNS request whose identifier information is the blocking identifier may be defended against, and the quantity of request times within the predetermined period may be determined for the DNS request whose identifier information is the detection identifier. The DNS request for which the request threshold is exceeded may be defended against, and the unblocking time may be determined for the DNS request for which the request threshold is not exceeded. The DNS request for which the unblocking time has been initiated may be accepted, and the DNS request for which the unblocking time has not been initiated, that is, the preset unblocking time which has not expired may be defended against. The identifier information may be preset, and defense processing may be directly performed on a specific request source or domain name, and only a request source or a domain name having an uncertainty may be further investigated and detected. Therefore, the procedure of determining a DNS attack may be simplified and the efficiency of determining the DNS attack may be increased. A manner in which both the determining result for the quantity of request times and the unblocking time are considered to increase accuracy of identifying a DNS attack.

Further, a method of searching for a request record corresponding to domain name information may be optimized, and a multilevel index table may be used for the search. Therefore, the optimization and the use of multilevel index table improve real-time performance and maintain service performance and efficiency.

Figure 10:
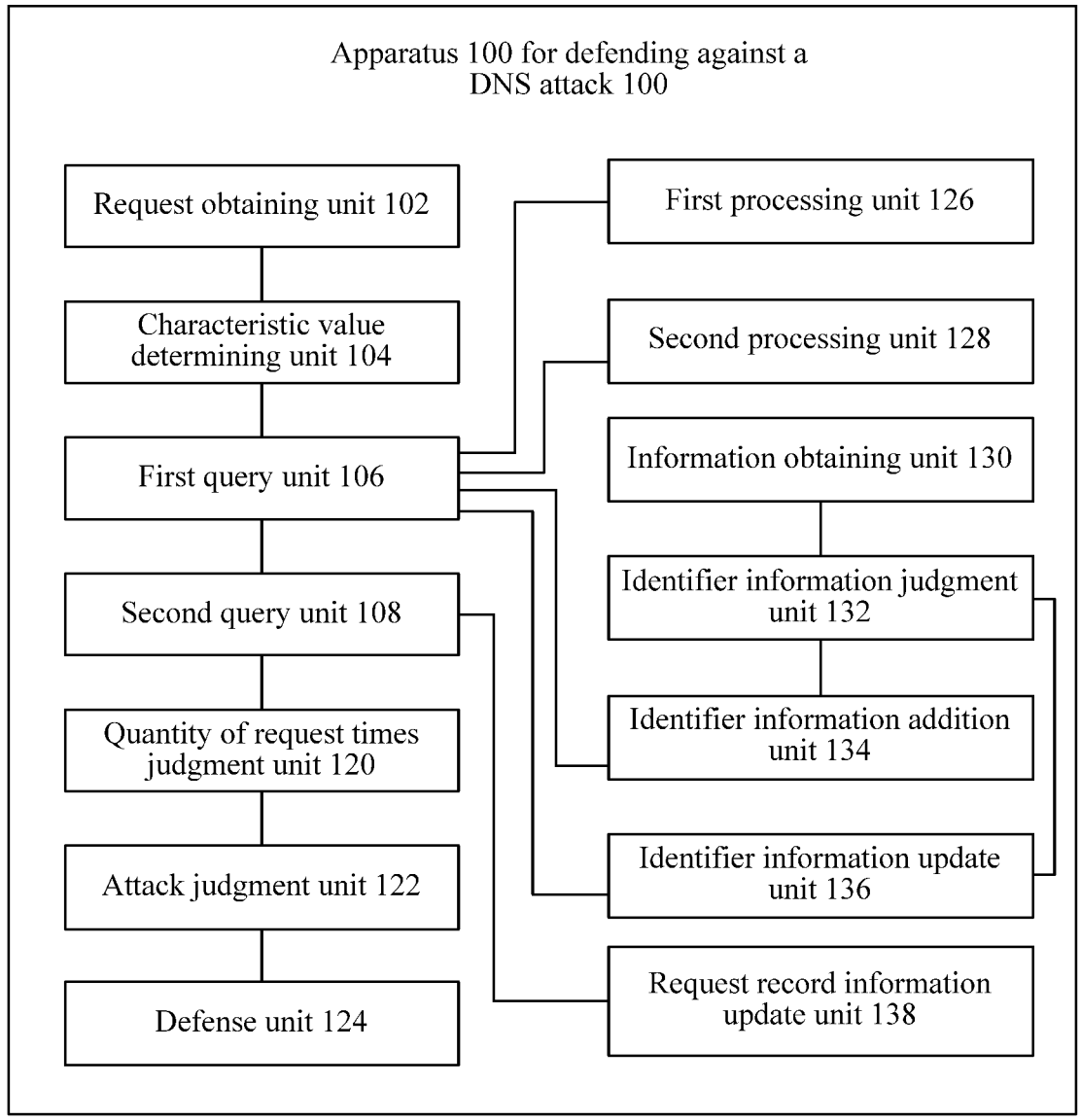
FIG. 10 is a schematic block diagram of an apparatus for defending against a DNS attack according to an embodiment.

FIG. 10 is a schematic block diagram of an apparatus for defending against a DNS attack according to an embodiment. The apparatus for defending against a DNS attack shown in FIG. 10 may be configured to implement the method for defending against a DNS attack. Referring to FIG. 10, the apparatus 100 for defending against a DNS attack may generally include a request obtaining unit 102, a characteristic value determining unit 104, a first query unit 106, a second query unit 108, a quantity of request times judgment unit 120, an attack judgment unit 122, and a defense unit 124. In some embodiments, based on a functional requirement and further optimization of the apparatus 100 for defending against a DNS attack, a first processing unit 126, a second processing unit 128, an information obtaining unit 130, an identifier information judgment unit 132, an identifier information addition unit 134, an identifier information update unit 136, and a request record information update unit 138 may be provided.

Among the foregoing functional modules, the request obtaining unit 102 is configured to receive a DNS request sent by a request source and obtain an IP address of the request source that sends the DNS request. The characteristic value determining unit 104 is configured to calculate a characteristic value of the IP address. The first query unit 106 is configured to search an internal memory for preset identifier information corresponding to the characteristic value, where the identifier information includes a whitelist identifier, a blacklist identifier, and a detection identifier. The second query unit 108 is configured to, when the identifier information found by the first query unit is a detection identifier used for identifying whether an attack risk exists for the DNS request, obtain request record information and an unblocking time that correspond to the characteristic value, where the request record information includes a quantity of request times of the request source within a predetermined period. The quantity of request times judgment unit 120 is configured to determine whether the quantity of request times exceeds a preset request threshold. The attack judgment unit 122 is configured to determine, based on a determining result of the quantity of request times and the unblocking time, whether the request source performs a DNS attack. For example, when the quantity of request times exceeds the preset request threshold or when the quantity of request times does not exceed the preset request threshold and a current time does not reach a preset unblocking time, determine that the DNS request is an attack request. The defense unit 124 is configured to defend against the DNS attack by discarding the DNS request.

In an embodiment, the request obtaining unit 102 is configured to perform step S101. The characteristic value determining unit 104 is configured to perform step S102. The first query unit 106 is configured to perform step S103. The second query unit 108 is configured to perform step S104. The quantity of request times judgment unit 120 is configured to perform step S105. The attack judgment unit 122 is configured to perform step S106. The defense unit 124 is configured to perform step S107.

In an embodiment, the request obtaining unit 102 may include a first check module and a second check module. The first check module is configured to determine whether a data format of a data packet of the DNS request satisfies a predetermined protocol and the second check module is configured to determine whether a destination port of the DNS request is a predetermined port. A determining condition of the first check module may be that the data packet is a UDP packet and a determining condition of the second check module may be that the destination port is 53. This is because the DNS protocol runs on the UDP and uses a port number 53. A reliable end-to-end service is provided at the transmission-layer TCP and a best-effort delivery service is provided at an UDP end. A control port performs on the UDP port 53.

The characteristic value determining unit 104 may include a first characteristic value determining module, a second characteristic value determining module, a third characteristic value determining module, and a fourth characteristic value determining module. The first characteristic value determining module is configured to determine the characteristic value of the IP address based on first three segments of numerical values of the IP address. The second characteristic value determining module is configured to determine the characteristic value of the IP address based on last three segments of numerical values of the IP address. The third characteristic value determining module is configured to calculate a hash value of the first three segments of numerical values of the IP address and use the hash value as the characteristic value of the IP address. The fourth characteristic value determining module is configured to calculate a hash value of the last three segments of numerical values of the IP address and use the hash value as the characteristic value of the IP address.

After a query is performed, access information needs to be added to a corresponding location in the internal memory to update access record information. The request record information update unit 138 is configured to update the request record information corresponding to the characteristic value. The request record information update unit may be configured to determine whether the request record information corresponding to the characteristic value in the internal memory is null, and if the request record information is null, save the information of the current DNS request as the request record information. If the request record information is not null, the request record information update unit determines whether a duration from a request time of a DNS request recorded in the request record information to a request time of the current DNS request exceeds the predetermined period, and if the duration exceeds the predetermined period, the request record information update unit updates the request time of the DNS request in the request record information, and return the quantity of request times in the request record information to zero. If the duration does not exceed the predetermined period, the request record information update unit updates the request time of the DNS request in the request record information, and increases the quantity of request times in the request record information by one.

The internal memory stores each array element in a form of an array, where the array element includes the characteristic value, the identifier information, the request record information, and the unblocking time, and the characteristic value.

The second query unit may be configured to search the internal memory for the request record information and the unblocking time based on the characteristic value of the IP address.

The attack judgment unit 122 may be configured to, when the quantity of request times judgment unit determines that the quantity of request times exceeds a request threshold, determine that the request source performs a DNS attack and reset the unblocking time corresponding to the characteristic value. When the quantity of request times judgment unit determines that the quantity of request times does not exceed a request threshold, the quantity of request times judgment unit may be configured to determine whether the unblocking time corresponding to the characteristic value has been initiated, and if the unblocking time is initiated, it may be further configured to determine that the DNS request is a normal request. Further, if the unblocking time has not been initiated, it may be configured to determine that the request source may be a DNS attack.

After the DNS request is checked in kernel space, data traffic surge in a time segment may occur in user space, and may appear to cause DNS attack. Therefore, the data traffic from the kernel space to the user space needs to be monitored in real time so that when the traffic surge occurs, a DNS request may be captured by using a hook function registered in a firewall framework by the operating system in advance, or the DNS request log may be analyzed to obtain a quantity of request times. Then, an IP address whose quantity of request times is excessively large may be used as a suspect object and marked by using a detection identifier, and IP address information and corresponding identifier information may be sent to the kernel space so that the kernel performs corresponding process. In an embodiment, the information obtaining unit 130 may be configured to obtain a characteristic value and identifier information of an IP address. The identifier information judgment unit 132 may be configured to determine whether identifier information corresponding to the characteristic value in an internal memory is null. The identifier information addition unit 134 may be configured to, when the identifier information judgment unit 132 determines that the identifier information is null, save the obtained identifier information as the identifier information corresponding to the characteristic value. The identifier information update unit 136 may be configured to, when the identifier information judgment unit 132 determines that the identifier information is not null, replace the identifier information corresponding to the characteristic value with the obtained identifier information.

The first processing unit 126 may be configured to, when the identifier information found by the first query unit is a blacklist identifier, discard the data packet of the DNS request. The second processing unit 128 may be configured to, when the identifier information found by the first query unit is a whitelist identifier, accept the DNS request.

Figure 11:
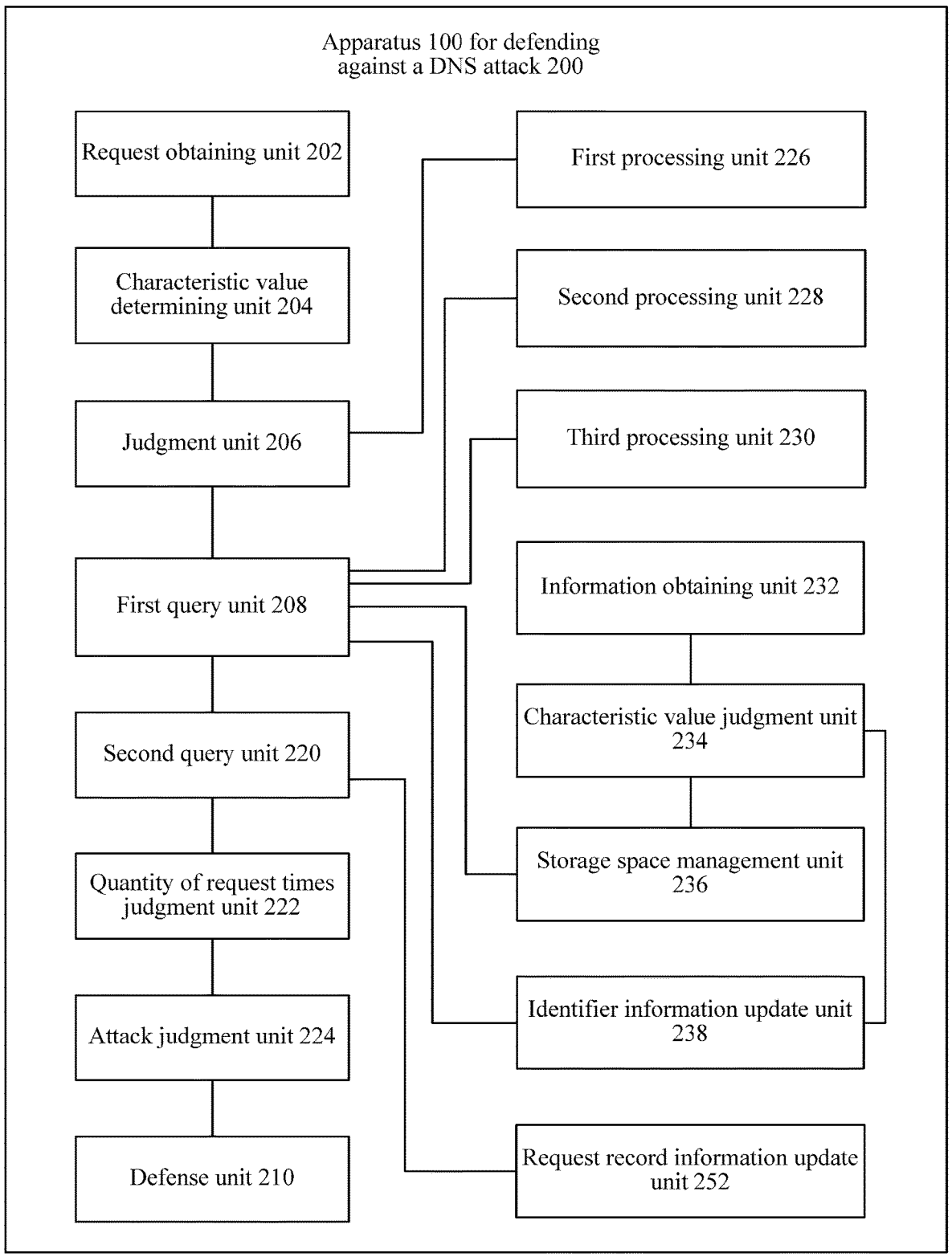
FIG. 11 is a schematic block diagram of an apparatus for defending against a DNS attack according to another embodiment.

FIG. 11 is a schematic block diagram of an apparatus for defending against a DNS attack according to an embodiment. The apparatus for defending against a DNS attack shown in FIG. 11 may be configured to implement the method for defending against a DNS attack in the embodiment. Referring to FIG. 11, the apparatus 200 for defending against a DNS attack may generally include a request obtaining unit 202, a characteristic value determining unit 204, a judgment unit 206, a first query unit 208, a second query unit 220, a quantity of request times judgment unit 222, an attack judgment unit 224, and a defense unit 210. In another embodiment, based on a functional requirement and optimization of the apparatus 200 for defending against a DNS attack, a first processing unit 226, a second processing unit 228, a third processing unit 230, an information obtaining unit 232, a characteristic value judgment unit 234, a storage space management unit 236, an identifier information update unit 238, and a request record information update unit 252 may be provided.

Among the foregoing functional modules, the request obtaining unit 202 may be configured to receive a DNS request and obtain a to-be-parsed domain name included in the DNS request. The characteristic value determining unit 204 may be configured to calculate a characteristic value of the domain name. The judgment unit 206 may be configured to determine whether an internal memory includes the characteristic value. The first query unit 208 may be configured to, when the judgment unit determines that the internal memory includes the characteristic value, obtain identifier information corresponding to the characteristic value, where the identifier information includes a blocking identifier, an unblocking identifier, and a detection identifier. The second query unit 220 may be configured to, when the identifier information found by the first query unit is a detection identifier used for identifying whether an attack risk exists for the DNS request, obtain request record information and an unblocking time that correspond to the characteristic value, where the request record information includes a quantity of request times of the domain name in a predetermined period. The quantity of request times judgment unit 222 may be configured to determine whether the quantity of request times exceeds a preset request threshold. The attack judgment unit 224 may be configured to determine, based on the determining result of the quantity of request times and the unblocking time, whether the DNS request is a DNS attack. For example, when the quantity of request times exceeds the preset request threshold or when the quantity of request times does not exceed the preset request threshold and a current time does not reach a preset unblocking time, the attack judgment unit may be configured to determine that the DNS request is an attack request and the defense unit 210 may be configured to defend against the DNS attack, for example, by discarding the DNS request.

In an embodiment, the request obtaining unit 202 may be configured to perform step S401. The characteristic value determining unit 204 may be configured to perform step S402. The judgment unit 206 may be configured to perform step S403. The first query unit 208 may be configured to perform step S404. The second query unit 220 may be configured to perform step S405. The quantity of request times judgment unit 222 may be configured to perform step S406. The attack judgment unit 224 may be configured to perform step S407. The defense unit 210 may be configured to perform step S408.

In an embodiment, the request obtaining unit 202 may include a first check module and a second check module. The first check module may be configured to determine whether a data format of a data packet of the DNS request satisfies a predetermined protocol. The second check module may be configured to determine whether a destination port of the DNS request is a predetermined port. A determining condition of the first check module may be that the data packet is a UDP packet and a determining condition of the second check module may be that the destination port is 53. This is because the DNS protocol runs on the UDP and uses the port number 53. A reliable end-to-end service may be provided at the transmission-layer TCP and a best-effort delivery service may be provided at the UDP end. A control port may operate on the UDP port 53.

The characteristic value determining unit 204 may include a first calculation module, a second calculation module, and a characteristic value determining module. The first calculation module may be configured to calculate a first hash value of the domain name by using a first hash algorithm. The second calculation module may be configured to calculate a second hash value of the domain name by using a second hash algorithm. The characteristic value determining module may be configured to use the first hash value and the second hash value as the characteristic value of the domain name.

The judgment unit 206 may include a judgment module, a first determining module, and a second determining module. The judgment module may be configured to determine whether the internal memory includes the first hash value of the domain name. The first determining module may be configured to, when the judgment module determines that the internal memory does not include the first hash value of the domain name, determine that the internal memory does not include the characteristic value of the domain name. The second determining module may be configured to, when the judgment module determines that the internal memory includes the first hash value of the domain name, determine whether a second hash value corresponding to the first hash value in the internal memory is the same as the second hash value of the domain name, and when the second hash value corresponding to the first hash value in the internal memory is the same as the second hash value of the domain name, determine that the internal memory includes the characteristic value of the domain name. When the second hash value corresponding to the first hash value in the internal memory is different from the second hash value of the domain name, the second determining module may be configured to determine that the internal memory does not include the characteristic value of the domain name.

The first processing unit 226 may be configured to, when the judgment unit determines that the internal memory does not include the characteristic value of the domain name, receive the DNS request.

The internal memory stores each array element in a form of an array, each array element is a linked list, a list head of the linked list stores a first hash value of the domain name, and each node of the linked list stores the second hash value, the identifier information, the request record information, and the unblocking time of the domain name.

The second determining module may further include a judgment submodule. The judgment submodule may be configured to traverse each node of a linked list including the first hash value and determine whether the second hash value stored in the node is the same as the second hash value of the domain name.

The attack judgment unit 224 may be configured to, when the quantity of request times judgment unit determines that the quantity of request times exceeds a request threshold, determine that the DNS request is a DNS attack and reset the unblocking time of the domain name. When the quantity of request times judgment unit determines that the quantity of request times does not exceed a request threshold, determine whether the unblocking time of the domain name has been initiated, and if the unblocking time is initiated, determine that the DNS request is a normal request. If the unblocking time has not been initiated, determine that the DNS request is a DNS attack.

The request record information update unit 252 may be configured to obtain a request time of a DNS request recorded in the request record information corresponding to the characteristic value, determine whether duration from a request time of a DNS request recorded in the request record information to a request time of this DNS request exceeds the predetermined period, and if the duration exceeds the predetermined period, update the request time of the DNS request in the request record information, and return the quantity of request times in the request record information to zero. If the duration does not exceed the predetermined period, update the request time of the DNS request in the request record information, and increase the quantity of request times in the request record information by one.

The information obtaining unit 232 may be configured to obtain a characteristic value and identifier information of a domain name, where the characteristic value includes a first hash value of the domain name calculated by using a first hash algorithm, and a second hash value of the domain name calculated by using a second hash algorithm. The characteristic value judgment unit 234 may be configured to determine whether the internal memory includes the characteristic value of the domain name. The storage space management unit 236 may be configured to, when the characteristic value judgment unit determines that the internal memory does not include the characteristic value of the domain name, write the first hash value of the domain name into a list head of a corresponding linked list, allocate storage space to the second hash value and the identifier information, and store storage pointers in the storage space.

The identifier information update unit 238 may be configured to, when the characteristic value judgment unit determines that the internal memory includes the characteristic value of the domain name, replace the identifier information corresponding to the characteristic value with the obtained identifier information.

The second processing unit 228 may be configured to, when the identifier information found by the first query unit is a blocking identifier, discard the data packet of the DNS request. The third processing unit 230 may be configured to, when the identifier information found by the first query unit is an unblocking identifier, accept the DNS request.

Figure 12:
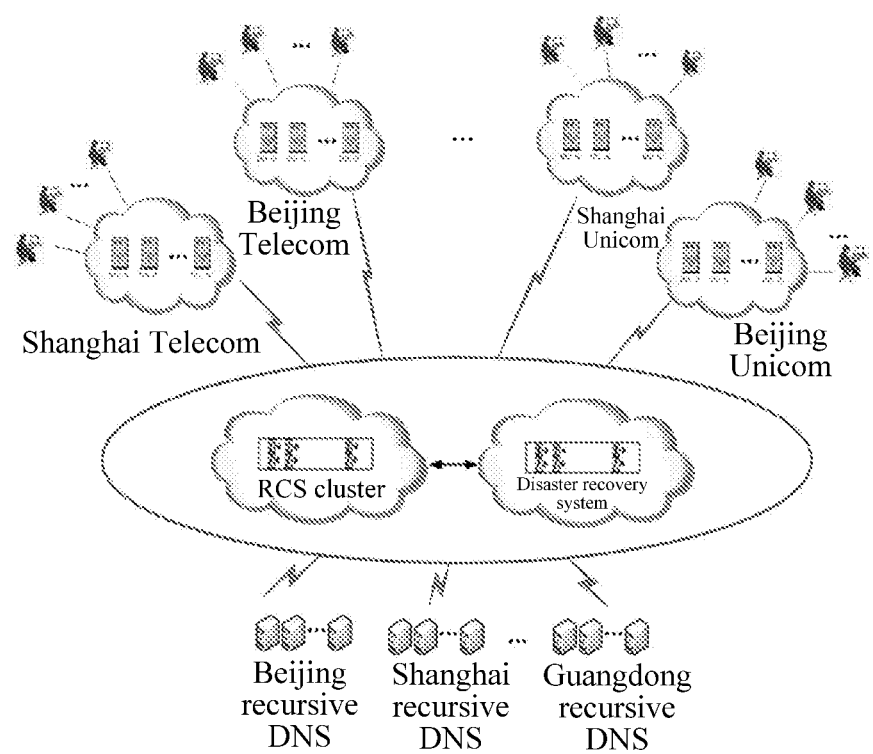
FIG. 12 is a system architectural diagram of a DNS system according to an embodiment.

FIG. 12 is a system architectural diagram of a DNS system according to an embodiment. The DNS system provides a domain name parsing service with high reliability, strong defense, and high performance. When a top-level server, a root-domain server, or an authorized server is attacked or fails, the DNS system in this embodiment may start a redundancy emergency response mode to ensure that the Internet network runs normally before the root-domain server or the authorized server recovers, so that there is enough time for urgent repair and recovery of the system. The DNS system is linked to a security guard on a client and may prompt a user as soon as possible and help the user to parse a domain name by using a safe DNS to allow quick recover. After a fault has been eliminated, a DNS of the user resets the settings prior to the fault.

The DNS system may include one or more DNS security servers (for example, the DNS servers deployed in Beijing Telecom, Shanghai Telecom, Shanghai Unicom, and Beijing Unicom as shown in FIG. 12), which are separately configured to perform domain name parsing on a DNS parse request sent by a client of the user. The apparatus for defending against a DNS attack described in the foregoing embodiments may be disposed on each DNS security server. In the DNS system architecture shown in FIG. 12, when a user of Shanghai Telecom, Beijing Telecom, Shanghai Unicom, or Beijing Unicom uses a network service, an apparatus for defending against a DNS attack may be disposed on the DNS security server. The apparatus receives a DNS request sent by a request source and obtains an IP address of the request source of the DNS request, determines a characteristic value of the IP address, searches the internal memory for identifier information of the IP address based on the characteristic value, where the identifier information may include a whitelist identifier, a blacklist identifier, and a detection identifier. If the found identifier information is a detection identifier, the apparatus obtains request record information and an unblocking time that correspond to the characteristic value, where the request record information includes a quantity of request times of the request source within a predetermined period. The apparatus determines whether the quantity of request times exceeds a preset request threshold. The apparatus determines, based on the determining result and the unblocking time, whether the request source poses a threat to a DNS attack and defends against the DNS attack. A defense method may include an ultrafast DNS request that may be directly filtered out, or security defense or prompt that may be performed by combining software, such as the security guard installed on the client of the user. For example, the client of the user outputs prompt information in a security suggestion display area or changes a DNS server address to a preset safe address.

By using a cache, the DNS security server uses various ways such as cache access optimization and present-update to reduce a parsing delay as much as possible, thereby, implementing high-speed and secure parsing. When a traffic of a request source of an IP address unusually surges, the apparatus for defending against a DNS attack automatically analyzes and adopts a security linkage measure to perform speedy limitation on a DNS parsing request source of the IP address. Accordingly, any subsequent process may be promptly performed by using an RCS cluster and a redundancy system on a DNS parsing request verified by the apparatus for defending against a DNS attack.

Shanghai Telecom, Beijing Telecom, Shanghai Unicom, and Beijing Unicom mentioned above are merely an example and are not limited thereto.

According to an embodiment, FIG. 12 provides the DNS system that is configured to provide a highly reliable and defensive domain name parsing service. When a top-level server, a root-domain server, or an authorized server is attacked or fails, the DNS system may start a redundancy emergency response mode to ensure that the Internet network runs normally before the root-domain server or the authorized server recovers so that there is enough time for urgent repair and recovery of a system. The DNS system linked to a security guard may prompt a user as soon as possible and help the user parse a domain name by using a secure DNS. This allows a quick recover, and after a fault has been eliminated, a DNS of the user may reset to settings prior to the fault.

According to an embodiment, the DNS system may include one or more DNS security servers, which may be separately configured to perform domain name parsing on a DNS parse request sent by a client of the user. According to another embodiment, the apparatus for defending against a DNS attack may be disposed on each DNS security server. When a user uses a network service, an apparatus for defending against a DNS attack may be disposed on the DNS security server. The apparatus receives a DNS request, obtains a to-be-parsed domain name included in the DNS request, and determines a characteristic value of the domain name and whether an internal memory includes the characteristic value. If the internal memory includes the characteristic value, the apparatus searches the internal memory for identifier information of the domain name based on the characteristic value, where the identifier information includes a blocking identifier, an unblocking identifier, and a detection identifier. If the found identifier information is a detection identifier, the apparatus obtains request record information and an unblocking time that correspond to the characteristic value, where the request record information includes a quantity of request times of the domain name within a predetermined period and determines whether the quantity of request times exceeds a preset request threshold. The apparatus further determines, based on the determining result and the unblocking time, whether the DNS request is a DNS attack and defends against the DNS attack. A defense method may include an ultrafast DNS request that may be directly filtered out, a security defense or a prompt may be performed by combining software, such as the security guard installed on the client of the user. For example, the client of the user may output prompt information in a security suggestion display area or change a DNS server address to a preset safe address.

By using a cache, the DNS security server uses various ways such as cache access optimization and present-update to reduce a parsing delay as much as possible, thereby, implementing high-speed and secure parsing. When a traffic of a request source of a domain name unusually surges, the apparatus for defending against a DNS attack automatically analyzes and adopts a security linkage measure, and sets domain name identifier information to limit a parsing request of the domain name. Accordingly, any subsequent process may be promptly performed by using an RCS cluster and a redundancy system on a DNS parsing request verified by the apparatus for defending against a DNS attack.

In accordance with the descriptions of the above implementations, a person skilled in the art may reasonably understand that the method according to the foregoing embodiments may be implemented by software or hardware. For example, the method may be implemented in a form of a software product. The computer software product may be stored in a storage medium, such as a ROM/RAM, a magnetic disk, or an optical disc, and may include several instructions for instructing a terminal device, which may be a mobile phone, a computer, a server, a network device, or the like, to perform the methods described herein.

Figure 13:
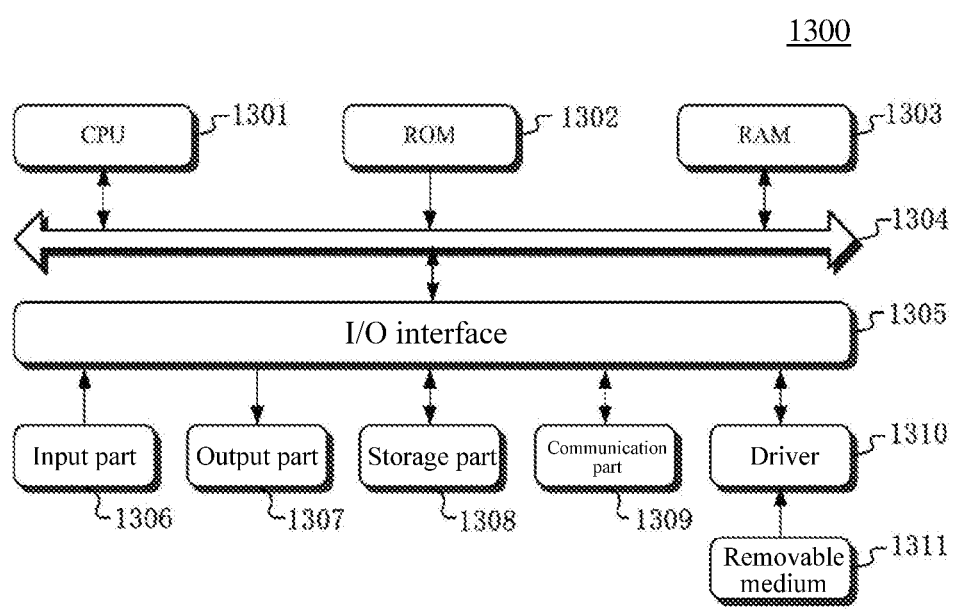
FIG. 13 is a schematic structural diagram of a computer system according to an embodiment.

FIG. 13 is a schematic structural diagram of a computer system that is applicable to implement a DNS server according to an embodiment.

As shown in FIG. 13, the computer system 1300 may include a central processing unit (CPU) 1301 to perform various processing and a program stored in a read-only memory (ROM) 1302 or a program loaded from a storage part 1308 into a random access memory (RAM) 1303. The RAM 1303 also may store various programs and data required to operate the system 1300. The CPU 1301, the ROM 1302, and the RAM 1303 may be connected to each other by a bus 1304. An input/output (I/O) interface 1305 may be also connected to the bus 1304.

The parts connected to the I/O interface 1305 may include an input part 1306, such as a keyboard, a mouse, or the like, an output part 1307, such as a cathode ray tube (CRT), a liquid crystal display (LCD), a speaker, or the like, a storage part 1308, such as a hard disk, and a communication part 1309, such as a network interface card or a modem. The communication part 1309 performs communication processing by using a network such as the Internet. A driver 1310 may be also connected to the I/O interface 1305. A removable medium 1311, such as a magnetic disk, an optical disc, a magneto-optical disk, or a semiconductor memory may be mounted on the driver 1310 so that a computer program reading from the removable medium 1311 may be installed on the storage part 1308.

According to an embodiment, the processes may be implemented as computer software programs. For example, a computer program product including a computer program implemented on a machine readable medium. The computer program includes program code configured to execute the methods described herein. In such an embodiment, by using the communication part 1309, the computer program may be downloaded and installed from a network and/or installed from the removable medium 1311.

The flowcharts and block diagrams in the drawings show architectures, functions, and operations that may be implemented for the system, the method, and the computer program according to various embodiments. For example, each box in a flowchart or a block diagram may represent a module, a program segment, or a part of code. The module, the program segment, or the part of code may include one or more executable instructions used for implementing specified logic functions. Some implementations may be used as substitutes, and functions may alternatively occur in a sequence different from those shown in the drawings. For example, the sequences shown in succession may be performed in parallel, and sometimes, the sequences may be performed in reverse. Further, a diagram and/or a flowchart and a combination of block diagram and/or the flowchart may be implemented by using a dedicated hardware-based system configured to perform a specified function or operation, or may be implemented by using a combination of dedicated hardware and a computer instruction.

A unit described herein may be implemented in a software or may be implemented in a hardware. In addition, the unit may be disposed in a memory. It may be a processor that performs the functions of units disclosed herein or may be included in in the memory, such as the receiving unit, the request unit, the determining unit, and the sending unit, to perform the operations performed by the foregoing units. These are merely an example of various units and are not limited hereto.

According to another aspect, an embodiment may further include a non-volatile computer storage medium. The non-volatile computer storage medium may be a non-volatile computer storage medium included in the apparatus in the foregoing embodiments or may be a non-volatile computer storage medium that independently exists and has not been mounted on a terminal. The foregoing non-volatile computer storage medium may store one or more programs, and the one or more programs may be executed by a device. The device may receive a DNS request sent by a request source, and obtain an IP address of the request source of the DNS request, determine a characteristic value of the IP address, search an internal memory for identifier information of the IP address based on the characteristic value, where the identifier information includes a whitelist identifier, a blacklist identifier, and a detection identifier.

The device may, if the found identifier information is a detection identifier, obtain request record information and an unblocking time that correspond to the characteristic value, where the request record information includes a quantity of request times of the request source within a predetermined period, and determine whether the quantity of request times exceeds a preset request threshold.

Based on the determining result and the unblocking time, the device may determine whether the request source performs a DNS attack and defend against the DNS attack.

The descriptions of the foregoing embodiments have different emphasis, and as for parts that are not described in detail in one embodiment, reference can be made to the relevant description of the other embodiments.

In addition, the disclosed apparatus for defending against a DNS attack may be implemented in other manners. For example, a plurality of units or components may be combined or integrated into another system. In addition, the displayed or discussed mutual couplings or direct couplings or communication connections may be implemented by using various interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, a person of ordinary skill in the art may make various improvements and refinements without departing from the spirit of this application. All such modifications and refinements should also be intended to be covered by this application.

What is claimed is:

1. A method for defending against a DNS attack, the method being performed by an apparatus for defending against the DNS attack, the method comprising:
receiving a DNS request from a request source;
obtaining an IP address of the request source from which the DNS request is received;

calculating a characteristic value of the IP address;
searching an internal memory for preset identifier information corresponding to the characteristic value;
obtaining request record information and an unblocking time corresponding to the characteristic value, the request record information including a number of request times from the request source in a predetermined period, based on the preset identifier information corresponding to the characteristic value being a detection identifier indicating an uncertainty of an existence of an attack risk in the DNS request;
determining that the DNS request is an attack request and discarding the DNS request, based on the number of request times exceeding a preset request threshold; and
determining that the DNS request is the attack request and discarding the DNS request, based on the number of request times not exceeding the preset request threshold and a current time not reaching a preset unblocking time,
wherein the obtaining request record information and the unblocking time further comprises:
saving information included in the DNS request as the request record information, based on the request record information corresponding to the characteristic value in the internal memory being null;
updating a request time of the DNS request in the request record information to a request time of a current DNS request and resetting the number of request times in the request record information to zero, based on the request record information in the internal memory not being null and a duration from the request time of the DNS request recorded in the request record information to the request time of the current DNS request exceeding the predetermined period; and
updating the request time of the DNS request in the request record information to the request time of the current DNS request and increasing the number of request times in the request record information by one, based on the request record information in the internal memory not being null and the duration from the request time of the DNS request recorded in the request record information to the request time of the current DNS request not exceeding the predetermined period.

2. The method according to claim 1, wherein the receiving the DNS request from the request source further comprises:
based on a data format of a data packet of the DNS request complying with a predetermined protocol and a destination port, determining the characteristic value of the IP address.

3. The method according to claim 1, wherein the calculating the characteristic value of the IP address further comprises:
determining the characteristic value of the IP address based on first three segments of numerical values of the IP address;
determining the characteristic value of the IP address based on last three segments of numerical values of the IP address,
wherein the determining the characteristic value of the IP address based on the first three segments of the numerical values of the IP address further comprises calculating a hash value of the first three segments of the numerical values of the IP address and using the hash value as the characteristic value of the IP address, and
wherein the determining the characteristic value of the IP address based on the last three segments of the numerical values of the IP address further comprises calculating the hash value of the last three segments of the numerical values of the IP address and using the hash value as the characteristic value of the IP address.

4. The method according to claim 1, wherein the internal memory stores each array element in a form of an array, the array element comprising the characteristic value, the identifier information, the request record information, and the unblocking time, and
the obtaining request record information and the unblocking time further comprises:
searching the internal memory for the request record information and the unblocking time based on the characteristic value of the IP address.

5. The method according to claim 1, the method further comprising:
based on the number of request times exceeding a request threshold, determining that the DNS request is the attack request and resetting the unblocking time corresponding to the characteristic value; and
based on the number of request times not exceeding the request threshold and the current time reaching the preset unblocking time, determining that the DNS request is a normal request.

6. The method according to claim 1, wherein the searching the internal memory for the preset identifier information corresponding to the characteristic value further comprises:
obtaining identifier information that is set based on a number of DNS request times in a preset time period and the corresponding IP address;
based on the identifier information corresponding to the characteristic value in the internal memory being null, storing the obtained identifier information in the internal memory; and
based on the identifier information corresponding to the characteristic value in the internal memory not being null, replacing the identifier information corresponding to the characteristic value with the obtained identifier information,
wherein the obtaining identifier information further comprises manually setting identifier information corresponding to the IP address.

7. The method according to claim 1, the method further comprising:
based on the identifier information being a blacklist identifier, discarding the DNS request; and
based on the identifier information being a whitelist identifier, accepting the DNS request.

8. A non-transitory computer readable storage medium storing a computer readable instruction to cause at least one processor to perform the method according to claim 1.

9. A method for defending against a DNS attack, the method being performed by an apparatus for defending against the DNS attack, the method comprising:
receiving a DNS request;
obtaining a domain name in the DNS request;
calculating a characteristic value of the domain name;
obtaining identifier information corresponding to the characteristic value, from an internal memory that stores the characteristic value;
obtaining request record information and an unblocking time that correspond to the characteristic value, the request record information including a number of request times from the domain name in a predetermined period, based on the identifier information corresponding to the characteristic value being a detection identifier indicating an uncertainty of an existence of an attack risk in the DNS request;

determining that the DNS request is an attack request and discarding the DNS request, based on the number of request times exceeding a preset request threshold; and determining that the DNS request is the attack request and discarding the DNS request, based on the number of request times not exceeding the preset request threshold and a current time not reaching a preset unblocking time, wherein the obtaining request record information and the unblocking time further comprises:

saving information included in the DNS request as the request record information, based on the request record information corresponding to the characteristic value in the internal memory being null;

updating a request time of the DNS request in the request record information to a request time of a current DNS request and resetting the number of request times in the request record information to zero, based on the request record information in the internal memory not being null and a duration from the request time of the DNS request recorded in the request record information to the request time of the current DNS request exceeding the predetermined period; and updating the request time of the DNS request in the request record information to the request time of the current DNS request and increasing the number of request times in the request record information by one, based on the request record information in the internal memory not being null and the duration from the request time of the DNS request recorded in the request record information to the request time of the current DNS request not exceeding the predetermined period.

10. The method according to claim 9, wherein the receiving the DNS request further comprises:

based on a data format of a data packet of the DNS request complying with a predetermined protocol and a destination port of the DNS request, obtaining the domain name included in the DNS request.

11. The method according to claim 9, the calculating the characteristic value of the domain name further comprises:

calculating a first hash value of the domain name using a first hash algorithm;

calculating a second hash value of the domain name using a second hash algorithm; and using the first hash value and the second hash value as the characteristic value of the domain name.

12. The method according to claim 11, wherein the determining that the internal memory stores the characteristic value of the domain name further comprises:

based on the internal memory storing the first hash value of the domain name and the internal memory storing the second hash value of the domain name, determining that the internal memory stores the characteristic value of the domain name.

13. The method according to claim 9, the method further comprising:

based on the number of request times exceeding a request threshold, determining that the DNS request is the attack request and resetting the unblocking time of the domain name; and based on the number of request times not exceeding the request threshold and the current time reaching the preset unblocking time, determining that the DNS request is a normal request.

14. The method according to claim 9, the method further comprising:

based on the identifier information being a blocking identifier, discarding the DNS request; and based on the identifier information being an unblocking identifier, accepting the DNS request.

15. A non-transitory computer readable storage medium storing a computer readable instruction to cause at least one processor to perform the method according to claim 9.

16. An apparatus for defending against a DNS attack comprising:

at least one memory configured to store computer program code; and at least one processor configured to access the at least one memory and operate according to the computer program code, and the computer program code comprising:

request obtaining code configured to cause the at least one processor to receive a DNS request sent by a request source and obtain an IP address of the request source that sends the DNS request;

characteristic value determining code configured to cause the at least one processor to calculate a characteristic value of the IP address;

first query code configured to cause the at least one processor to search an internal memory for preset identifier information corresponding to the characteristic value;

second query code configured to cause the at least one processor to, based on the preset identifier information corresponding to the characteristic value being a detection identifier indicating an uncertainty of an existence of an attack risk in the DNS request, obtain request record information and an unblocking time corresponding to the characteristic value, the request record information comprising a number of request times from the request source in a predetermined period;

number of request times judgment code configured to cause the at least one processor to determine whether the number of request times exceeds a preset request threshold;

attack judgment code configured to cause the at least one processor to:

based on the number of request times exceeding the preset request threshold, determine that the DNS request is an attack request, based on the number of request times not exceeding the preset request threshold and a current time not reaching a preset unblocking time, determine that the DNS request is the attack request; and defense code configured to cause the at least one processor to discard the DNS request, wherein the internal memory further comprises:

request record information update code configured to cause the at least one processor to:

based on the request record information corresponding to the characteristic value in the internal memory being null, save information included in the DNS request as the request record information;

based on the request record information corresponding to the characteristic value in the internal memory not being null and a duration from a request time of the DNS request recorded in the request record information to a request time of a current DNS request exceeding the predetermined period, update the request time of the DNS request in the request record information to the request time of the current DNS request and reset the number of request times in the request record information to zero; and based on the request record information corresponding to the characteristic value in the internal memory not being null and the duration from the request time of the DNS request recorded in the request record information to the request time of the current DNS request not exceeding the predetermined period, update the request time of the DNS request in the request record information to the request time of the current DNS request and increase the number of request times in the request record information by one.

17. The apparatus according to claim 16, wherein the internal memory further comprises:

first processing code configured cause the at least one processor to discard the DNS request based on the identifier information indicating that the first query code is a blacklist identifier; and second processing code configured to cause the least one processor to accept the DNS request based on the identifier information indicating that the first query code is a whitelist identifier.

\* \* \* \* \*